United States Patent [19]

Elms et al.

[11] 4,453,117

[45] Jun. 5, 1984

[54] MOTOR CONTROL APPARATUS WITH SHORT TERM UNDERVOLTAGE MOTOR MODE SAVER

[76] Inventors: Robert T. Elms, 735 Heartwood Dr., Monroeville, Pa. 15146; Pamela M. Maynard, 509 Coal St., Wilkinsburg, Pa. 15221; Denis A. Mueller, 83 Ballantree Dr., Asheville, N.C. 28803

[21] Appl. No.: 485,090

[22] Filed: Apr. 14, 1983

[51] Int. Cl.³ .................. H02H 3/08; H02H 3/24
[52] U.S. Cl. ..................... 318/778; 361/33; 361/92; 364/483; 364/492; 318/434
[58] Field of Search ............ 318/778, 782, 434, 334; 361/33, 92; 364/492, 483; 373/276, 277

[56] References Cited

U.S. PATENT DOCUMENTS

| | | | |
|---|---|---|---|
| 3,784,846 | 1/1974 | Krick et al. | 361/33 |
| 4,197,582 | 4/1980 | Johnston et al. | 364/483 |
| 4,291,355 | 9/1981 | Dirger | 364/492 |
| 4,339,779 | 7/1982 | Kalbach | 361/33 |
| 4,356,526 | 10/1982 | Russell | 361/92 |
| 4,371,947 | 2/1983 | Fujisawa | 364/492 |

Primary Examiner—J. V. Truhe
Assistant Examiner—Arthur G. Evans

[57] ABSTRACT

A microprocessor control motor starter is utilized in which a capacitor-backed random access memory is utilized to store certain critical data about the status of a motor so that if the power supply voltage temporarily drops below a certain value the critical information will not be lost. The microprocessor which controls the motor attempts to reinitialize itself as in the case long term power outage. A subroutine is provided which determines whether the motor can immediately be placed in the state it was in before the power outage occurred, or whether an automatic restart may take place, or whether the motor must be operator restarted manually.

3 Claims, 32 Drawing Figures

$a = 1\angle 120°$

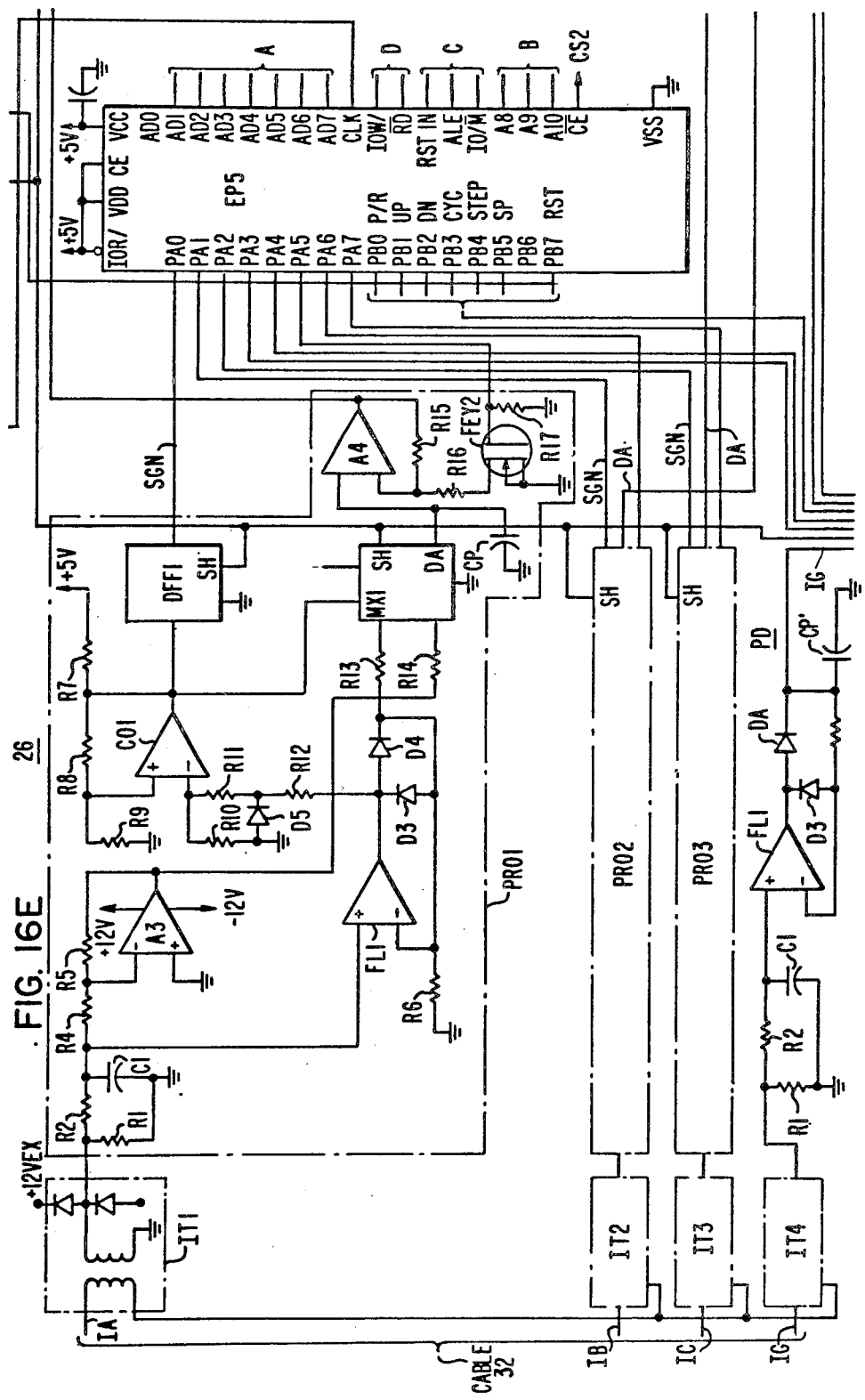

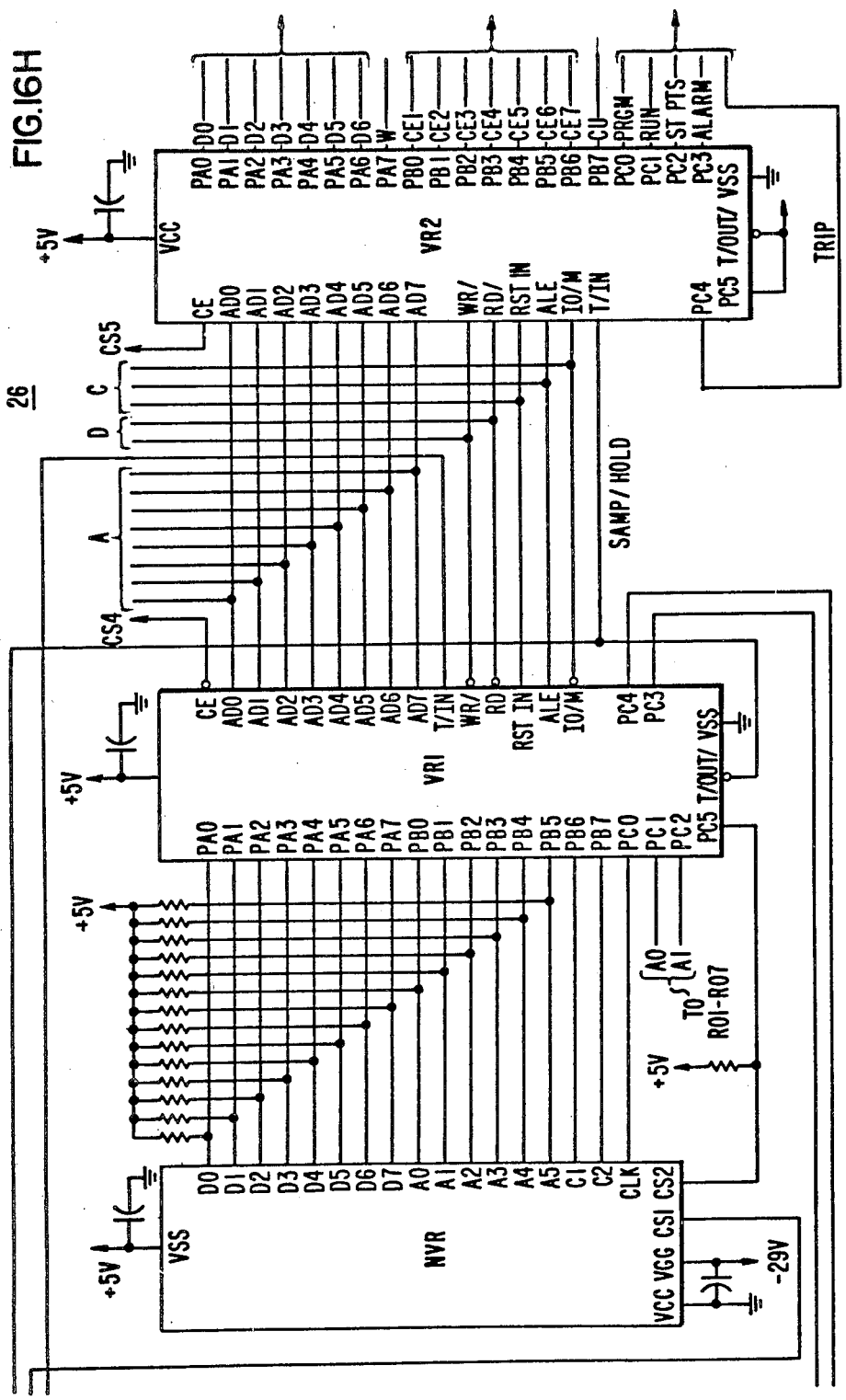

MOTOR CONTROL APPARATUS WITH SHORT TERM UNDERVOLTAGE MOTOR MODE SAVER

BACKGROUND OF THE INVENTION

1. Field of the Invention

The subject matter of this invention is related generally to motor controllers and is related more specifically to microprocessor-controlled motor controllers.

2. Description of the Prior Art

Motor controllers or motor starters as they are sometimes called are well known in the art. Generally, they comprise a switch or ganged switches which are operable to open or close to provide or interrupt current to the stator windings, for example, of an electric motor. The opening and closing process is controlled by appropriately arranged relay coils and relay contacts in what is well known in the prior art as a "relay ladder" arranged in a logical order to properly sequence the starting and/or stopping of the motor.

With the advent of the microprocessor it was found that part, if not all of the relay logic arrangement, could be replaced by a properly programmed microprocessor. Such arrangements are shown and described in a paper entitled "A Quantative Analysis of Grouped Single-Phase Induction Motors" published on page 125 of the IEEE Transactions on Industry Applications, Vol. 1A-17 No. 2, March/April 1981 by J. R. Dunki-Jacobs and Robert H. Kerr; a paper entitled "Thermal Tracking-A Rational Approach to Motor Protection" by D. R. Boothman, E. C. Elgar, R. H. Rehder and R. J. Wooddall identified as IEEE Transactions Paper 274029-5 recommended for presentation at the IEEE PES Winter Meeting, New York, N.Y., Jan. 27–Feb. 1, 1974; a paper entitled "Microprocessor-Based Universal Motor Protection System" appearing in the IEEE Transactions on Industry Applications, Vol. 1A-17 No. 1, January/February 1981 by E. B. Turner and H. Michael Willey and in a descriptive bulletin (41-560(E)) entitled MOTOGARD TM for motor protection by the Westinghouse Canada Switchgear and Control Division issued January 1980. A reading of all of the above will show that certain factors are of importance when discussing motor starters or motor controllers.

Since microprocessor-based motor controllers often utilize power derived from the line they are to protect as a power supply for the memories and static devices of the microprocessor in known microprocessor controllers such as the type described in U.S. patent application Ser. No. 339,610 entitled "Motor Control Apparatus With True RMS Non-Sinusoidal Negative Sequence Stator Current Protection Mode", filed Jan. 15, 1982, momentary disruption of the voltage on the lines being monitored can provide a false indication of loss of power. Generally, a microprocessor in this situation will utilize a routine to reset the microprocessor to an initialization point and cause the motor controller contacts to open. This may be viewed as a failsafe type of operation which is more desirable than having the microprocessor function in a garbled manner, but less desirable than having the motor controller contacts open when such is not necessarily required. It will be advantageous therefore if apparatus could be found which could be utilized to determine if a short term power outage should lead to a reinitialization of the microprocessor program and opening of the motor controller contacts.

SUMMARY OF THE INVENTION

In accordance with the invention motor control apparatus is taught which utilizes a microprocessor for performing the motor control functions. A subroutine is provided in the microprocessor for determining if a change in the power supply level requires reinitialization of the microprocessor and opening of the motor controller contacts. The presence of a RESET signal alerts the subroutine to check to see if certain memory locations retain valid data. If the data is not determined to be valid, then an initialization will take place. However, if it appears that the data is valid then another portion of the subroutine checks to see if the contacts of the motor controller are opened or closed by determining if current is still flowing in the lines being monitored. If the contacts are closed, certain specific initialization values for certain memory locations are recalculated and the microprocessor is placed in the same operational mode that it was in at the time of the temporary power outage. If on the other hand the contacts are shown to be open, then a routine is utilized to determine whether the outage has been longer than a predetermined preset interval or not. If the outage was longer than that interval than a routine is utilized to reinitialize setpoints and to insure that the motor is in fact shut down. Manual restart is then necessary. If on the other hand the predetermined time delay has not been exceeded, then an abbreviated initialization occurs and the motor is automatically restarted.

BRIEF DESCRIPTION OF THE DRAWINGS

For a better understanding of the invention, reference may be had to the preferred embodiment thereof shown in the accompanying drawings in which:

FIGS. 16A through 16H show the schematic diagram partially in circuit diagram form, partially in functional block form and partially in block diagram form for the control unit 26 of FIG. 2;

DESCRIPTION OF THE PREFERRED EMBODIMENT

Figure 1:
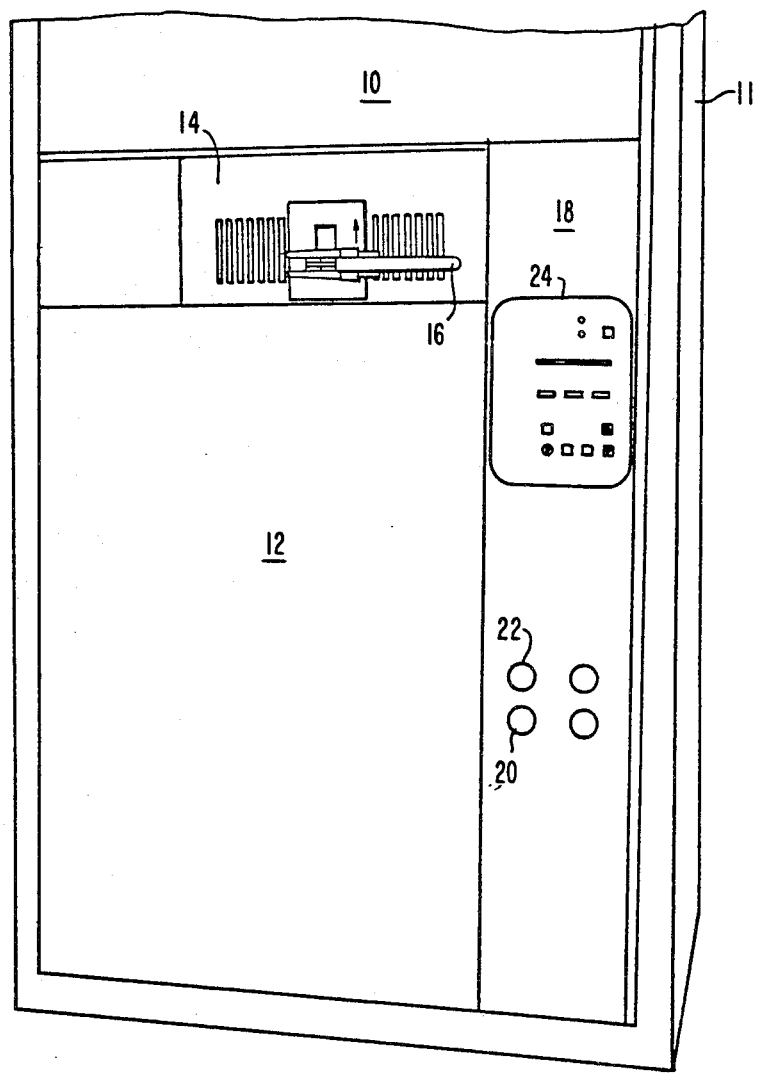
FIG. 1 shows a front view of the cabinet of a microprocessor controlled motor controller.

Referring now to the drawings and FIGS. 1 through 6, respectively, a motor controller assembly 10 is shown. In particular, motor controller assembly 10 may comprise a cabinet 11 having a hinged door 12 on the front thereof, a contactor assembly 14 is disposed behind door 12 and has a control handle 16 which is accessible from the front of the cabinet 11. A second hinged door 18 is provided having disposed thereon a start button 20 with an associated lamp and a stop button 22 with an associated lamp. In the preferred embodiment of the invention, the start button 20 is red and the stop button 22 is black. Disposed above the previously mentioned start and stop buttons is a modular front panel 24 which is conveniently attached to the back of door 18 and protrudes therethrough. Modular panel 24 is shown in greater detail in FIG. 5 and will be described in greater detail with respect to FIG. 5 hereinafter.

Figure 2:
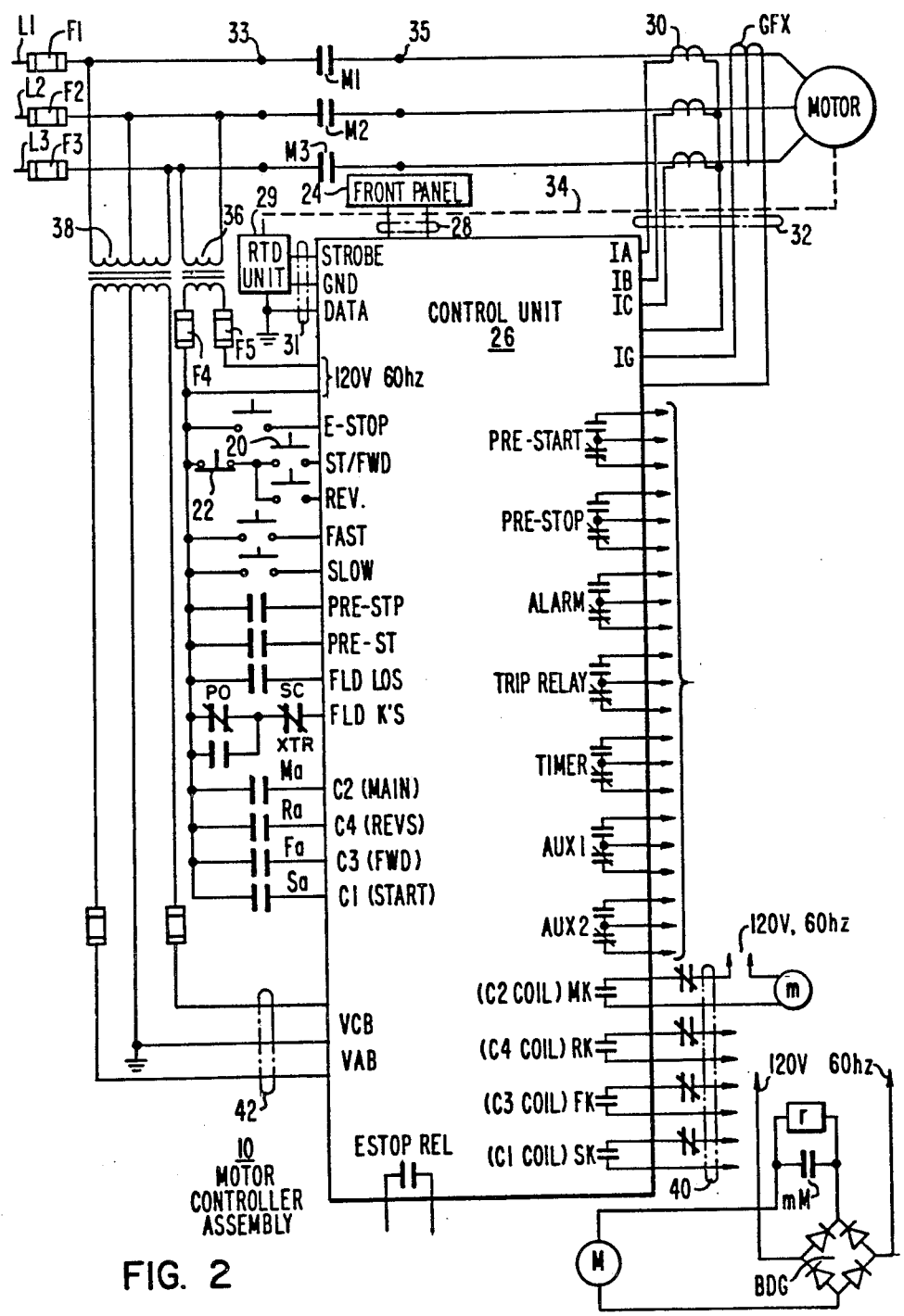
FIG. 2 shows a circuit diagram partially in schematic form and partially in block diagram form for the motor control apparatus of FIG. 1.
Figure 3:
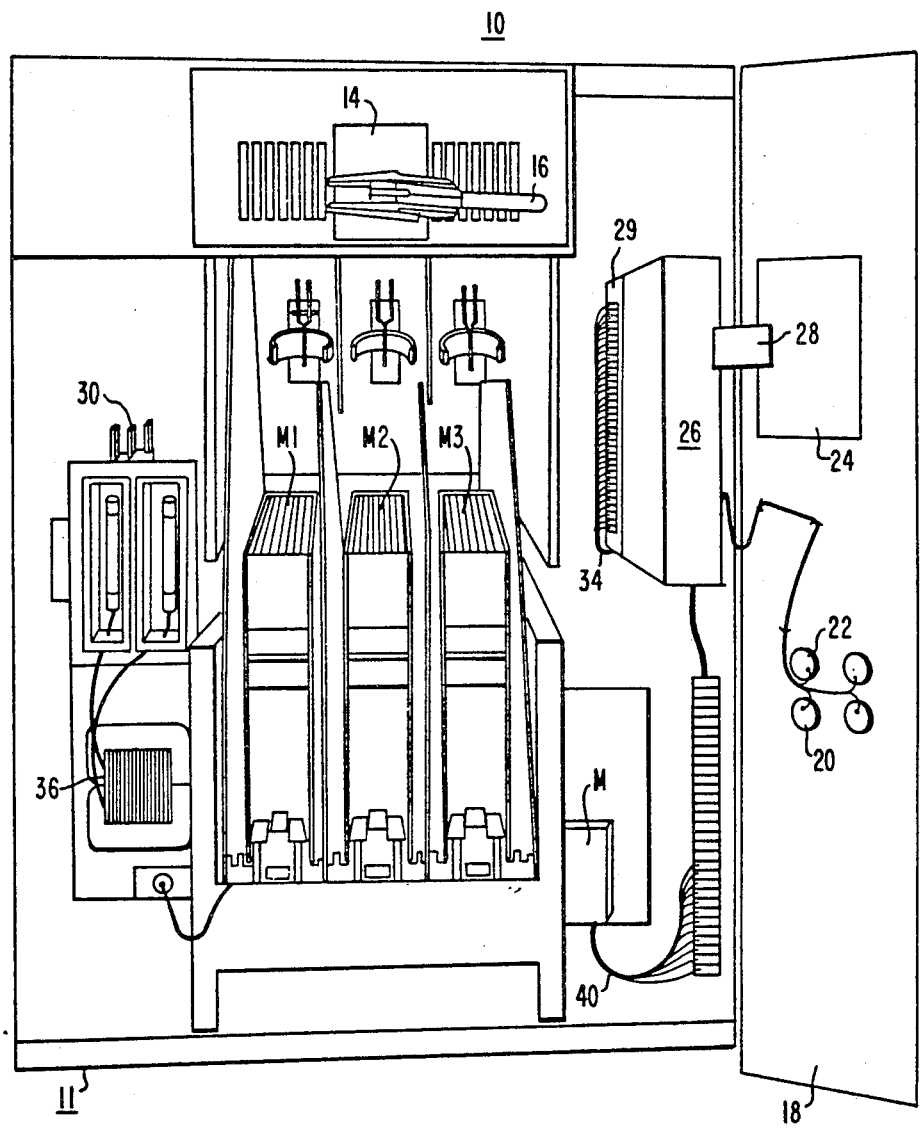
FIG. 3 shows the motor control apparatus of FIG. 1 with the front doors open and with the contactors in place.
Figure 4:
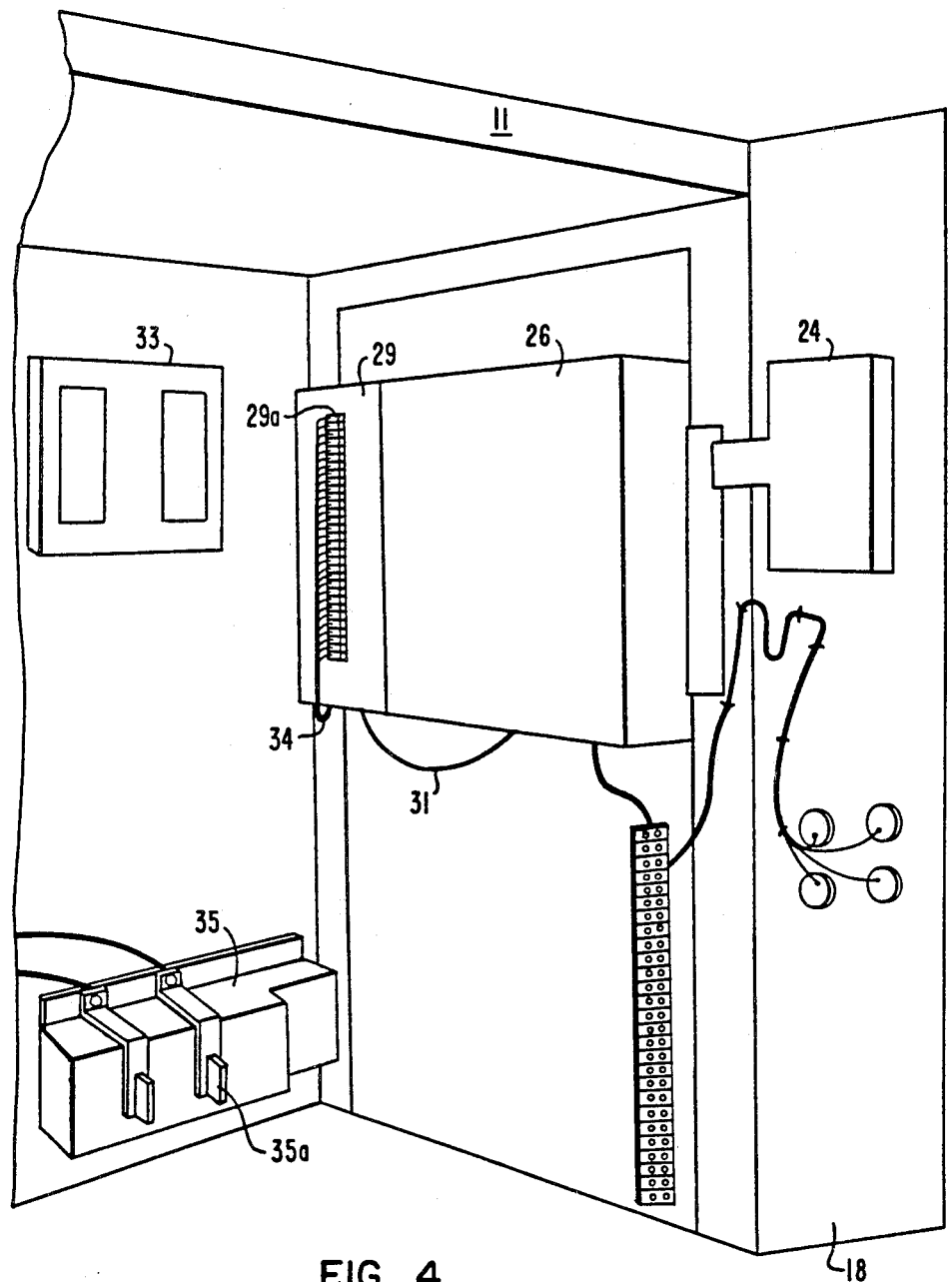
FIG. 4 shows a view similar to FIG. 1 but slightly offset and with the contactors removed.

Referring more specifically to FIGS. 2, 3 and 4, the arrangement of the various control assembly portions is shown with the doors 12 and 18 swung open. The contactor assembly 14 may be rolled into or out of the cabinet 11 by way of convenient wheels and rails for servicing, replacement or other useful purposes. The contactor assembly 14 in the preferred embodiment of the invention is interconnected with a three-phase electrical system (not shown). Contactors M1, M2 and M3 are interconnected with appropriate lines in the three-phase electrical system for opening and closing in ganged relationship according to appropriate control functions. A multi-wire flat ribbon cable 28 interconnects front panel 24 with control unit 26 which is disposed on the upper right-hand portion of the inner side wall of the cabinet 11. A resistor temperature detecting (RTD) unit 29 abuts the control unit 26. RTD unit 29 is interconnected electrically with control unit 26 by way of a three-wire cable 31 (as is best shown in FIG. 4). The RTD unit 29 interconnects with a motor MOT (not shown) by way a cable 34. Various motor field winding regions and bearing regions are monitored by resistance temperature detectors at the motor and the signals are fed back through wires in cable 34 to the RTD unit 29 for processing. The control unit 26 cooperates with the contactor assembly 14 to cause the contactors M1, M2 and M3 to open or close in response to electrical energy supplied to a main coil M by way of lines or leads in a cable 40. In the preferred embodiment of the invention, contactor coil M is energized or deenergized in accordance with the opening and closing of a relay contact mM which is disposed in series with the coil M and with a source of power which is basically provided by a bridge network BDG as is best shown in FIG. 2. The control unit 26 operates to close a relay contact MK which in turn drives a relay coil m which is the coil which controls the previously-mentioned relay contact mM. The energization of the coil M causes the contactors M1, M2 and M3 to close. Furthermore, a feedback relay contact Ma is provided for alerting the control unit 26 to the status of the main line contactors M1, M2 and M3. Current transformers 30 are interconnected with the electrical lines L1, L2 and L3 of the previously-mentioned electrical system for providing information by way of cable 32 to the control unit 26. This information is related to the status of the electrical currents in the lines L1, L2 and L3.

Referring now specifically to FIG. 4, the inner portion of the cabinet 11 is shown. It will be noted that the removable contactor assembly 14 of FIG. 3 has been removed from cabinet 11. Cabinet 11 shown in the disposition of FIG. 4 gives a clear view of the physical arrangement of panel 24, control unit 26 and a resistance temperature detector unit 29. Disposed in the upper inside rear portion of cabinet 11 is a shielded terminal assembly 33 in which the high voltage lines L1, L2 and L3 are interconnectable with appropriate stabs in the roll-out contactor assembly 14. Likewise, in the lower inside rear portion of the cabinet 11 is shown a contact assembly 35 having stabs 35a therein which are interconnectable with appropriate connectors in the lower portion of the rollout contactor assembly 14. Assembly 35 is interconnected with the motor MOT which the controller assembly 10 controls.

Referring now more specifically to FIG. 2, a diagrammatic representation of the controller assembly 10 and its associated apparatus is depicted. It will be noted that the three-phase input power is provided by way of the electrical lines L1, L2 and L3 to the three-phase motor MOT by way of the serially-connected contactors M1, M2 and M3. The disconnect points or connector assemblies 33 and 35 are representatively shown in FIG. 2. It will be noted that current transformers 30 monitor electrical currents in the lines L1, L2 and L3 providing an indication thereof by way of cable 32 to the control unit 26. Furthermore, a ground fault transformer GFX also provides information by way of a cable 32 input to the controller 26 for ground fault protection. Schematically shown interlinking the motor MOT and the RTD unit 29 is the cable 34 in which in the preferred embodiment of the invention, ten sets of lines interconnect resistance temperature detectors in the field regions and bearing regions of the motor MOT to the appropriate input terminal board 29a (FIG. 4) of the RTD unit 29. The interconnection of the RTD unit 29 with the control unit 26 by way of three wire cable 31 is also shown in FIG. 2. The control unit 26 receives 110 volt, 60 Hz input power by way of transformer 36 (also shown in FIG. 3) which is connected across one phase of the input power lines. The high side of the transformer secondary is utilized to be interconnected with one side of various inputs, relay contacts and switches which are connected to the control unit 26 for appropriate control functions. A high voltage, three phase transformer 38 is provided for interconnecting the three phase lines with the central control unit 26 by way of cable 42. Shown to the right of the control unit 26 are output relays which are utilized for supplying appropriate output information to other control stations auxiliary equipment or the like. It will be noted that one of the input contacts for the control unit 26 is designated as normally open relay contact Ma and is shown on the left of the control unit 26. Also shown to the left of control unit 26 and connected in parallel circuit relationship with the last-mentioned relay contact Ma are three other relay contacts Ra, Fa and Sa. These represent the functions reverse, forward and start, respectively. Although not utilized in the preferred embodiment of the invention, these relay contacts may be utilized in other embodiments of the invention. For example, three other sets of three-phase contactor assemblies, such as 14, shown in FIG. 3, may be utilized in conjunction with the contactor assembly 14 to perform other functions and all four may be controlled and monitored by the same control unit 26. There may be a motor reversing contactor assembly, the status of which is determined by the control unit 26 through monitoring the relay contact Ra, a motor forward contactor assembly, that status of which is monitored by the control unit 26 by way of relay contact Fa and a start contactor, the status of which is monitored by the control unit 26 by way of control relay SA. The start contactor may be utilized to impose low voltage conditions on motor windings during start-up. Likewise, as is shown on the lower right of FIG. 2, output contactor drive coil interconnected with control unit relay contacts RK, FK and SK, respectively, may be provided for causing the appropriate opening and closing actions of the contactor assemblies associated therewith. The interconnection of a contactor drive assembly such as is shown with respect to main contactor coil M and its energizing relay contact coil m may be likewise provided with respect to output relay contacts RK, FK and SK, respectively. In FIG. 2, the arrangement of start and stop pushbuttons 20 and 22 with respect to the control unit 26 and the appropriate power supply is shown. It will be noted that to the left of the control unit 26, other switches and relay contacts are shown interconnected in circuit relationship with the control unit 26. Ranging from top to bottom, the following inputs may be found with regard to controller unit 26 of FIG. 2. At the top is shown the RTD unit 29 which provides input information by way of cable 31 to the control unit 26. Below that are shown two inputs for 120 volt, 60 Hz power. Below that is shown an emergency stop button designated E-stop. Below that is a combination of the start button 20 connected in series circuit relationship with the stop button 22, both of which are inputted to a start forward ST/FWD input terminal. Below that is interconnected the reverse pushbutton REV. Below that is a fast pushbutton FAST and a slow pushbutton SLOW. Below that are three relay contacts, all of which are normally open. The first is a pre-stop relay contact designated PRE-STP. Below that is a pre-start normally open relay contact designated PRE-ST and below that is a field loss normally open relay contact designated FLD LOS. Below that is a three contact arrangement PO, SC and XTR designated FLD K's. As mentioned previously, the four normally-opened contactor status relays may be provided for the main contactor, the reverse contactor, the forward contactor and the start contactor designated Ma, Ra, Fa and Sa, respectively. These contacts may be interconnected with the control unit 26 at designations C2, C4, C3 and C1, respectively, for main, reverse, forward and start functions, respectively. The designations arbitrarily relate to coils which may be numerically rearranged provided consistent arrangements are made with respect to appropriate outputs and control functions. On the lowest portion of control unit 26 is shown the three-wire cable 42 which is interconnected with high voltage transformer 38 for supplying line voltages VCB and VAB, as inputs to the control unit 26. At the bottom of control unit 26 is the emergency stop relay ESTOP REL. Shown to the upper right are another set of inputs for the control unit 26. Specifically, cable 32 delivers to the control unit 26 information concerning line currents IA, IB, IC and ground fault current IG. The line currents are provided by way of current transformers 30 and the ground fault current information is provided by way of ground fault transformer GFX. All of the aforementioned constitute inputs for the control unit 26. It may be monitored information as in the case of line currents or control information as in the case of the start and stop buttons. Generally, however, the information flows from outside of the controller to the controller. That is, it is a one-way flow of information. However, also shown on the right of control unit 26 are output relay contacts which generally provide the opposite function from that previously discussed. That is, information flows from the control unit 26 to an outside device or system. The first of these represents a relay arrangement including one normally opened relay and one normally closed relay which is designated PRE-START. The next is designated PRE-STOP. The next is designated ALARM. The next is designated TRIP-RELAY. The next is designated TIMER, and the last two in that set of contacts are designated AUX1 and AUX2. Finally, below that are the four normally opened relay contact arrangement for driving the contactors of the motor control assembly 10. In this case, they are specifically designated MK, RK, FK and SK for the main contactor, the reverse contactor, the forward contactor and the starting contactor, respectively. As was the case with respect to the similar input arrangements, the latter represent arbitrarily chosen coil designations C2, C4, C3 and C1, respectively. In the particular arrangement shown, with respect to FIG. 2, only main contactors M1, M2 and M3 are utilized for the three-phase system. There is a third device represented by the front panel 24 which is interconnected with the control unit 26 by way of the cable 28. In the case of front panel 24, information may flow both ways, that is from the panel 24 to the control unit 26 and from the control unit 26 to the front panel 24.

Referring at this time specifically to FIGS. 6A, 6B, 6C, 14D, 16A, 16B, 16E and 16F, a more detailed description of the interconnection between the aforementioned input and output devices and the electronic portions of the control unit 26 is provided. As a general statement, input information is provided by way of appropriate buffers to electronically programmable read-only memories or to volatile random access memories or to analog signal conditioning devices for analog processing and then eventual processing in analog-to-digital converters.

Figure 16A:
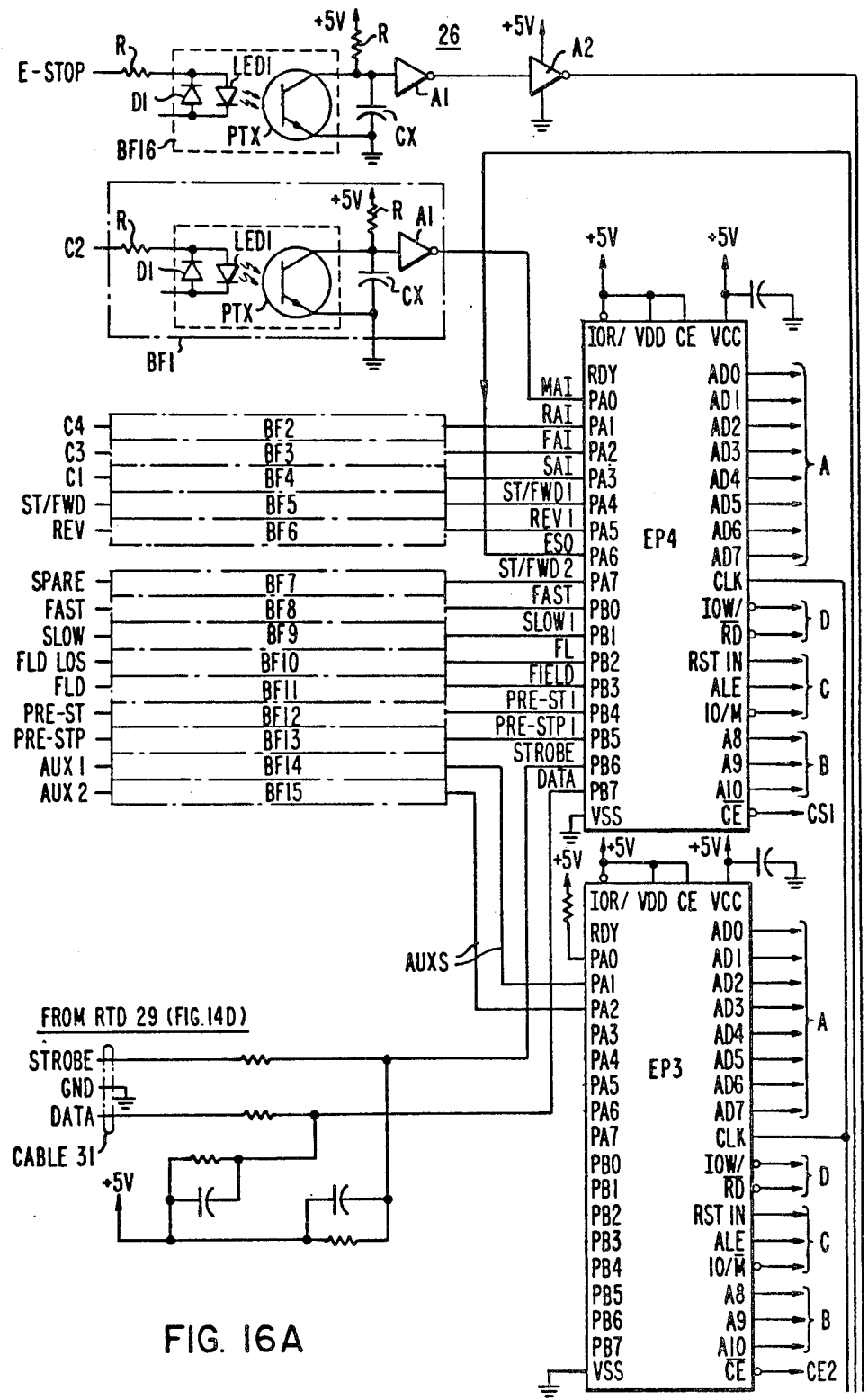

Referring now specifically to FIG. 16A, many of the previously-described inputs for the control unit 26 of FIG. 2 are designated once again. For example, coil input C2 (designated C2 (START) in FIG. 2) is provided to an isolating buffer BF1. The isolating buffer includes an input resistor interconnected with the cathode of a diode D1 and the anode of a light-emitting diode LED1. For purposes of simplicity of illustration, most of the resistive elements shown in the drawings and described with respect thereto will be designated R for purposes of convenience and simplicity. A photosensitive transistor PTX is interconnected with a +5 volt power supply by way of a limiting resistor and has a capacitive element CX connected thereacross. The collector output of the photo-transistor PTX is interconnected with an inverting amplifier A1, and from there is connected to the PA0 input of an electrically programmable read-only memory (EPROM) EP4. The electrically programmable read-only memory, EP4 is well known in the art and is described in the INTEL ® manual dated September, 1978, designated MCS-85 TM User's Manual, page 543 through page 552 in a chapter designated 8755A16,384.bit EPROM with I/O. The latter is incorporated by reference herein for simplicity and convenience. When the input signal C2 is high, the light-emitting diode LED1 is energized, thus providing light to the base of the photo-transistor PTX, turning that transistor on, thus dropping the voltage on the input to the inverting amplifier A1 to low value, thus causing the output of the aforementioned amplifier 81 to go high. This is indicated as signal MAI and is provided as a single bit input to the EPROM EP4. How the control unit 26 utilizes this bit of information will be described hereinafter with respect to a further description of the operation of the control unit 26. In a like fashion, input signals C4, C3, C1, ST/FWD, REV, SPARE, FAST, SLOW, FLD LOS, FLD, PRE-ST, PRE-STP, AUX1, and AUX2, are provided to inputs BF2 through BF15, respectively, where buffers BF2 through BF15 are essentially the same as buffer BF1 described previously. The output signals from the buffers BF2 through BF15, respectively, are designated RAI, FAI, SAI, ST/FWD1, REV1, ST/FWD2, FAST, SLOW1, FL, FIELD, PRE-ST1, PRE-STP1, and AUXS (2). The latter signals are provided to inputs PA1 through PA5, PA7, PB0 through PB5 of EPROM EP4 and inputs PA1 and PA2 of EPROM EP3, respectively. EPROM EP3 is essentially the same as EPROM EP4. The input for terminal PA6 of EPROM EP4 is designated ESO and will be described hereinafter. Likewise, the inputs PB6 and PB7 of EPROM EP4 constitute the STROBE and DATA inputs from the RTD 29 of FIG. 14D and will also be described in greater detail hereinafter.

Figure 16B:
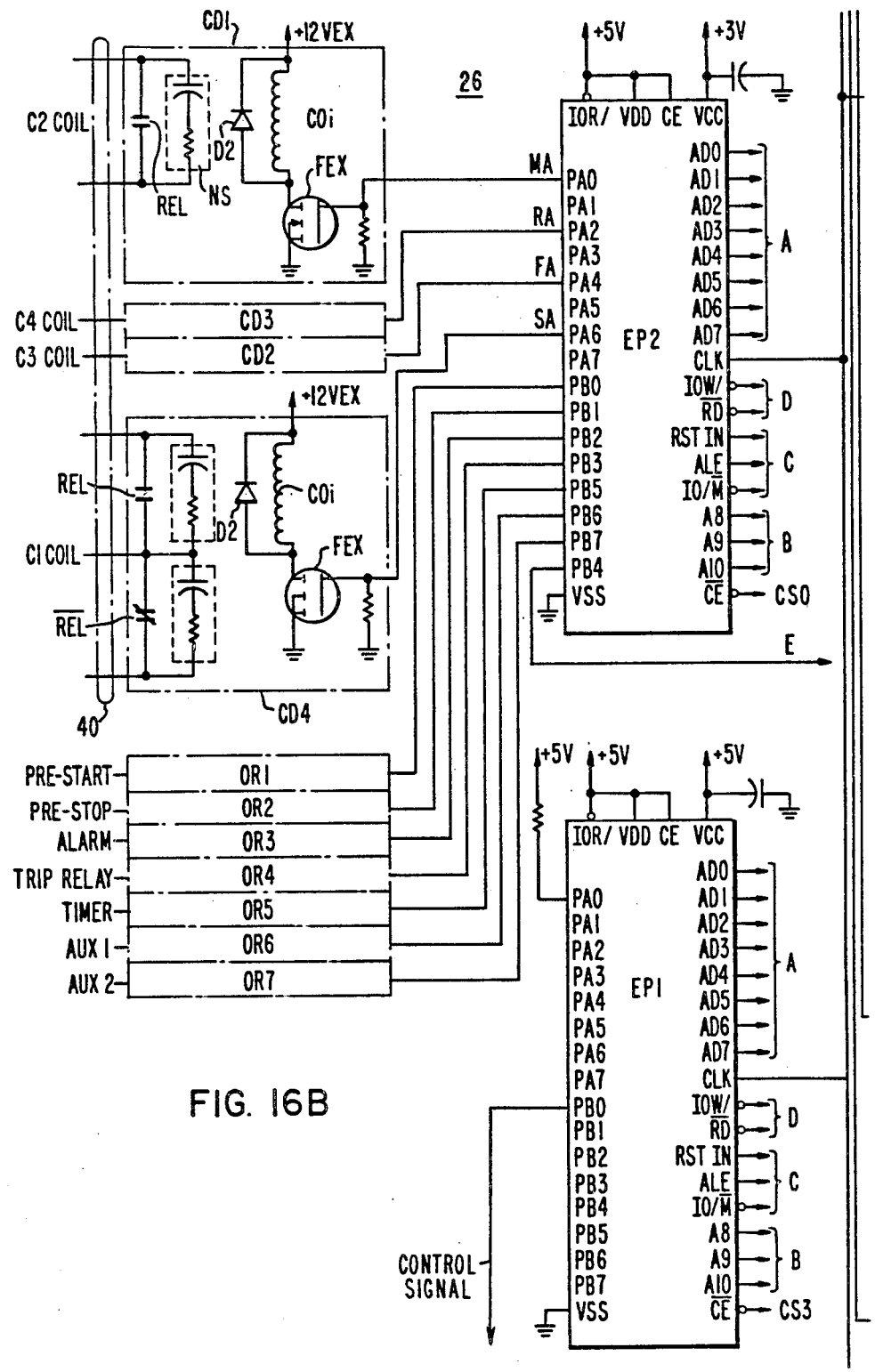

Referring now specifically to FIG. 16B, the interrelation of the previously-described outputs shown to the right of control unit 26 in FIG. 2 with respect to their associated buffers and an electrical programmable read-only memory EP2 is shown. Coils C2, C3 and C4 are driven by identical coil drivers CD1, CD2 and CD3, respectively. Coil driver CD1, for example comprises a field effects transistor FEX connected at the base thereof to the output terminal PA0 of the electrically programmable read-only memory EP2. That output is designated MA. The collector in the field effects transistor FEX is connected to one side of relay coil COi, the other side of which is connected to a 12 volt power supply +12 VEX. A standard diode D2 is connected across the coil for protection. Relay REL, which is driven by coil COi represents the output relay MK shown in FIG. 2. Coil driver CD4 is essentially the same as coil drivers CD1 through CD3 except that a complementary normally closed relay $\overline{REL}$ is also incorporated. The latter relay is not shown in the diagram of FIG. 2, but is provided herewith as an indication of the versatility of the system. When the field effects transistor FEX is turned on, energy is provided to the coil COi, of sufficient magnitude to close the relay contact REL, of course, with respect to the coil driver CD4, relay REL is closed and $\overline{REL}$ is opened. Coil drivers CD1 through CD4 are connected to terminals PA0, PA4, PA2 and PA6 of the electrically programmable read-only memory EP2 and have their inputs designated as MA, FA, RA and SA, respectively. Also shown in FIG. 16B as functional blocks are output relays OR1 through OR7. Each of the output relays OR1 through OR7 has the same configuration as the coil driver CD4 described previously. The outputs of the output relays OR1 through OR7 are as follows. PRE-START, PRE-STOP, ALARM, TRIP RELAY, TIMER, AUX1, and AUX2, respectively. The inputs thereof are connected to terminals PB0 through PB7 of the programmable read-only memory EP2, in the following order, respectively: PB0, PB1, PB2, PB3, PB5, PB6 and PB7. Also shown in FIG. 16B is an electrically programmable read-only memory EP1 which is, at this time, provided as a spare, that is, it performs no function, but is available for expanding the output capacity of the control unit 26. The devices EP1 and EP2 are essentially the same as devices EP3 and EP4 described with respect to FIG. 16. Terminal PB4 of the electrically programmable read-only memory EP2 provides an output E which is utilizable in the emergency stop section EMG STOP of the control unit 26 which will be described in greater detail with respect to FIG. 16D.

Referring once again to FIG. 16A, it can be shown that the E-STOP input is provided to a buffer BF16 which is identical to buffers BF1 and BF15 described previously. This signal is provided to a second inverting amplifier A2 and from the output thereof to the emergency stop EMG STOP section of the control unit 26 as will be shown and described hereinafter with respect to FIG. 16D. The latter signal is designated E-STOP.

Figure 16C:
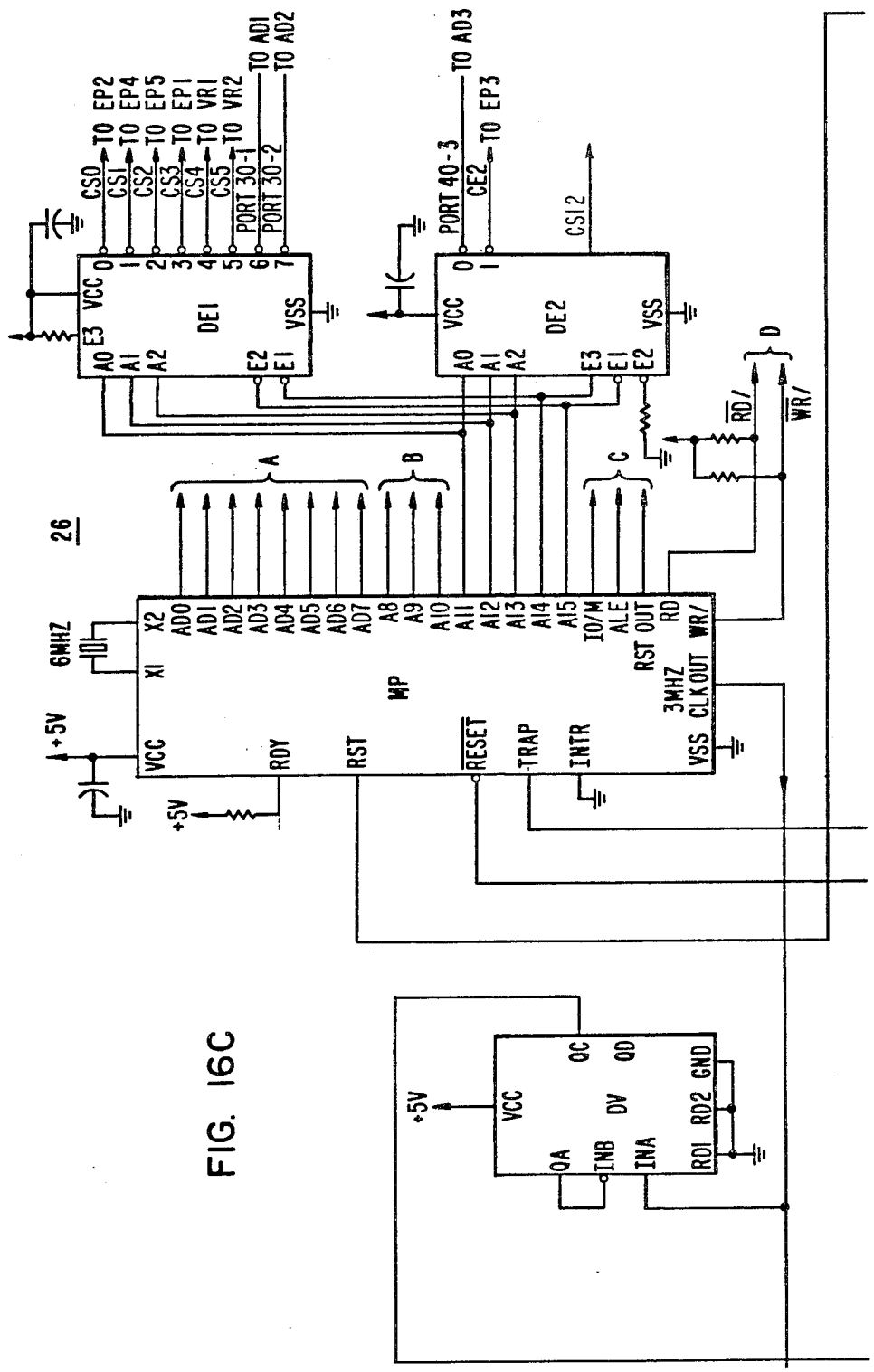
Figure 16D:
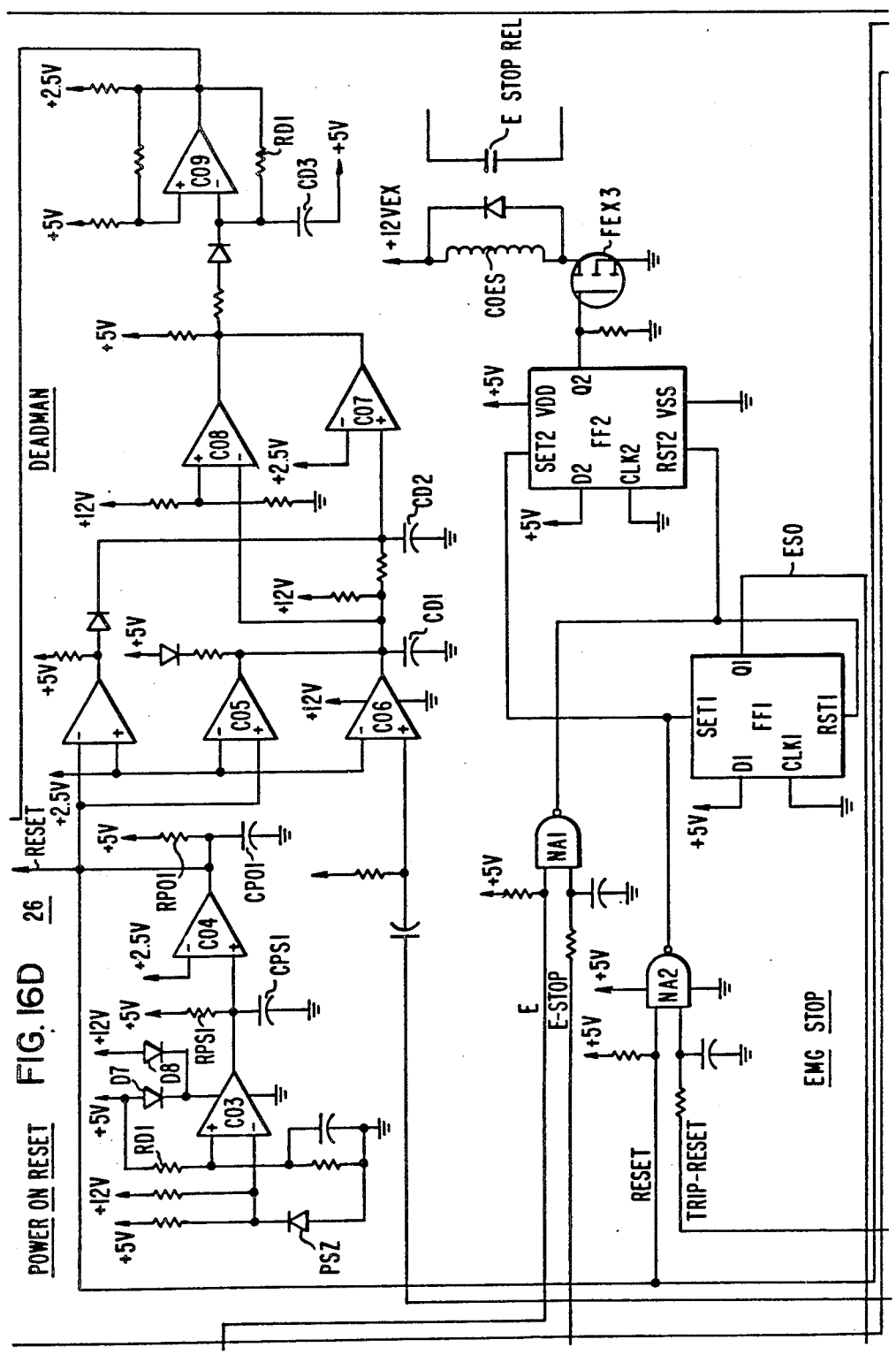

Referring now to FIG. 16E, analog input portions for the currents IA, IB, IC and IG carried by cable 32 to the control unit 26 is described. Each of the currents is provided to an input transformer and from there to a processor. For purposes of simplicity of illustration, processor PRO1 will be described in detail, it being understood that processors PRO2 and PRO3 are identical with processor PRO1. The arrangement of the input transformer IT1 is obvious and no further discussion will be made thereabout. The processor PRO1 comprises resistors R1 and R2 connected together at one end thereof. The other end of resistor R2 is connected to one side of a capacitive element C1, the other end of resistive element R1 is connected to the other side of the capacitive element C1 and to ground. The junction between the resistive element R2 and capacitive element C1 is connected to a resistive element R4 and to one input terminal of a follower FL1. The other side of the resistive element R4 is connected to one side of a resistive element R5 and to the negative input terminal of an inverting amplifier A3. The positive terminal of the latter-mentioned amplifier is grounded. The other terminal of the follower FL1 is connected by way of resistive element R6 to ground and to the anode of a diode D3, the cathode of which is connected to the output of the follower FL1, to the anode of a diode D4 and to one side of a resistive element R12. The output of the inverting amplifier A3 is connected to the other side of the resistive element R5 and to one side of a resistive element R14. The cathode of a diode D4 is connected to the anode of the diode D3 and to one side of a resistive element R13. The other side of resistive element R12 is connected to the cathode of a diode D5 and to one side of a resistive element R11, the other side of which is connected to an input terinal of a comparator CO1 and to one side of a resistive element R10. The other side of the resistive element R10 is connected to the anode of the diode D5 and to ground. The other input terminal of the comparator CO1 is connected to one side of a resistive element R9 and to one side of a resistive element R8. The other side of the resistive element R9 is grounded, and the other side of the resistive element R8 is connected to one side of a resistive element R7, to the output of the comparator CO1, to the multiplexing input terminal of a multiplexer MX1 and to the input terminal of a data flip-flop DFF1. Control terminals SH for the data flip-flop DFF1 and the multiplexer MX1 are connected to a sample and hold line. One input of the multiplexer MX1 is connected to the other side of resistive element R13 and the other input of the multiplexer MX1 is connected to the other side of the resistive element R14. Both the data flip-flop, DFF1 and the multiplexer MX1 are grounded at appropriate terminals. The data output of the multiplexer MX1 is connected to one side of capacitive element CP and to one input terminal of a range control amplifier A4. The other input terminal of the range control amplifier A4 is connected to a common junction between resistive elements R15 and R16. The other side of the resistive element R15 is connected back to the output of the ranging amplifier A4. The other side of the resistive element R16 is connected to the collector of a field effect transistor FEX2, the emitter in which is grounded. The base of the field effects transformer FEX2 is connected to a grounded resistor R17 and to the programmable controller EP5 at input terminal PA5 thereof. The output SGN of the data flip-flop DEF1 is connected to the PA0 terminal of the device EP5. The output of the ranging amplifier A4 is connected to one input of a multiplexer MX2 as shown in FIG. 16G. The corresponding ranging amplifier outputs of the processors PRO2 and PRO3 for currents IB and IC, respectively, are connected to input terminals of multiplexers MX3 and MX4, respectively, of FIG. 16G. Likewise, the SGN output signal from the data flip-flops EFF1 of processors PRO2 and PRO3 are connected to terminals PA1 and PA2 of the programmable read-only memory device EP5, respectively. A sample and hold signal is provided to each of the processors PRO2 and PRO3 at SH. Referring once again to input transformer IT1 and processor PRO1, when the instantaneous current IA is provided to the input transformer IT1, it is reduced in value to a workable level and then provided to the processor PRO1 where the resistor R1 converts the current to a voltage which is proportional to the current. The combination of the element R2-C1 provides a noise filter. The signal is then provided concurrently to the inverting amplifier A3 and to the follower FL1. The outputs of the follower and the inverting amplifier are the same signal, but 180° out of phase. Both the signals are provided by way of resistors R13 and R14 respectively to the inputs of the multiplexer MX1 where they are available for sampling. The output of the follower is also provided to the comparator CO1. The output of the comparator CO1 is a digital signal which is indicative of whether the output of the follower FL1 is positive or negative with respect to the output of the inverter amplifier. This two-state output signal from the comparator CO1 is provided as an input to the data flip-flop DFF1. If the output of the follower FL1 is positive, indicative of positive input current IA, the output of the comparator CO1 will be zero because the value of the voltage between the resistors R8 and R9 is deliberately made very close to zero. If the output of the comparator CO1 is low. The output of the data flip-flop DFF1 will also be low or close to zero, which is indicative of a positive current IA. On the other hand, if the current IA is in the negative part of its cycle, the output of the follower FL1 will be negative, and correspondingly, the output of the comparator CO1 will be high making the output of the data flip-flop high. A high or digital one at the output of the data follower DFF1 is indicative of a negative input current IA. The data flip-flop DFF1 and the multiplexer MX1 are sampled simultaneously by way of the sample and hold input signal at SH. Both outputs are sampled simultaneously. The data flip-flop gives the sign of the input current while the multiplexer output gives the magnitude thereof at the time of sampling. The output of the multiplexer MX1 is fixed or held for a short period of time by the cooperative action of the capacitor CP and the input impedance of the amplifier A4. Furthermore, the other input terminal of the amplifier A4 is interconnected with resistive elements R15 and R16 as well as the field effects transistor FEX2 in such a fashion that the gain of the latter-mentioned amplifier can be either times-one or times-four. If the signal on the base of the field effects transistor FEX2 is low, the gain of the amplifier A4 will be times-four. If, on the other hand, the signal on the base of the transistor FEX2 is high, the gain of the amplifier A4 will be times-one. In essence, the microprocessor (not yet described) senses the overall magnitude of the output of the amplifier A4 at a very early stage during the sample and hold cycle and readjusts the gain of that amplifier A4 by way of an output signal from the programmable read-only memory EP5 to be either times-four or times-one depending upon appropriate ranging conditions. The output of the comparator CO1 is fed to the multiplexing control terminal of the multiplexer MX1 so that the input at resistive element R13 is read when the current IA is positive and the input at resistive element R14 is read when the current is negative. This provides only positive output currents at the data output DA of the multiplexer MX1 as a function of the output of the comparator CO1. This signal is provided as a level to the previously-described analog to digital converters of FIG. 16G. It is relatively easy to see, therefore, that the outputs of the processors PRO2 and PRO3 for currents IB and IC, respectively, can be controlled and operated upon correspondingly. During a predetermined sampling cycle, all of the outputs IA, IB and IC from the ranging amplifiers A4 of the processors PRO1, PRO2 and PRO3 are supplied to the multiplexers MX2, MX3 and MX4, respectively, of the A to D circuits, AD1, AD2 and AD3, respectively, of FIG. 16G. This is done at a one-half cycle rate for the input currents IA, IB, IC so that the magnitude of the positive half cycles and the magnitude for the negative half cycles are read and introduced into the A to D converters in sequence. With regard to the current IG, that is, ground fault current, it will be noted that an input transformer IT4 similar to input transformer IT1 is provided. Furthermore, a peak detector PD utilizing many of the circuit elements and arrangements described with respect to the processor PRO1 is provided. In this case, ranging and polarity detection is not necessary. Consequently, a simplified circuit is utilized. The resistive element R1 which changes current to voltage is utilized as well as the noise suppressing network R2-C1, the follower FL1 operates in a manner similar to follower FL1 of processor PRO1. The capactive element CP' is utilized to hold the peak of the output signal from the follower FL1. This signal is provided to an analog impedance buffer BUF1 and thence to the upper input terminal of a multiplexer MXX. There is also provided a circuit for determining how long the 5 volt power supply voltage has been off in the event that it does go off. The anode of a diode DX1 is connected to the 5 volt power supply. The cathode of the diode is connected concurrently to one side of a resistive element RX1 and one side of a capactive element CX1. The other side of the resistive element RX1 is connected to ground and the other side of the capacitive element CX1 is connected to the junction between a second resistive element RX2 and a third resistive element RX3. The other side of the third resistive element RX3 is connected to ground and the other side of the second resistive element RX2 is connected to the input terminal of a second impedance buffer and to a capacitive element CX2. The other side of the capacitive element CX2 is connected to ground. Resistive element RX2 and capacitive element CX2 cooperate to provide a high frequency noise filter. The output of the impedance buffer BF2 is connected to the lower input terminal of the multiplexer MXX. The output terminal of the multiplexer MXX is connected to a sample and hold buffer SHX. The output of the buffer SHX is provided to the lower input terminal of the multiplexer MX4 of FIG. 16G. The control terminal CONT of the multiplexer MXX is connected to the PB0 terminal of the device EP1 shown in FIG. 16B. As was described previously, device EP1 is known as an electrically programmable read-only memory (EPROM). It operates in conjunction with the microprocessor MP of FIG. 16C to determine at what time the output terminal of the multiplexer MXX will read the upper or ground current terminal of the multiplexer MXX or the lower or time terminal of the multiplexer MXX. The conditions for switching will be described hereinafter with respect to FIG. 20. The capacitive element CX1 is normally charged to 5 volts and a small amount of current flows through RX1 to ground. Point XX at the bottom of the capacitor or the input terminal to buffer BUF2 is at 0. If the power supply voltage drops, that is if the 5 volts on the anode of the diode DX1 goes low, the diode DX1 opens because it is reverse biased. The capacitor CX1 then discharges through the resistive element RX1. The discharge path includes the resistive element RX1 and the resistive element RX3. It's a timed discharge which is predetermined. The capacitive element CX1 as it discharges loses voltage thereacross. In the event that the 5 volt power supply comes back on again, the diode DX1 will immediately forward bias and raise the voltage on the upper end of the capacitor CX1 to 5 volts. Since voltage cannot change instantaneously across the capacitor, the point XX will immediately increase by an amount equal to the distance between the capacitive voltage which was across the capacitor in 5 volts. This then represents a step voltage increase to the buffer BF2 which is supplied to the lower input terminal of the multiplexer MSX. This voltage is proportional to the discharge time represented by the capacitive element CX1 in the combination of the resistive element RX1 and resistive element RX3. When the control signal to the control terminal CONT of the multiplexer MXX is switched so as to cause the lower input terminal of the multiplexer MXX to be interconnected to the sample and hold buffer SHX, a signal is provided to the multiplexer MX4 of FIG. 16G which is representative or proportional to the amount of time that the power supply voltage has been off. This then is available for use in other portions of the controller system in the manner previously described with respect to any of the various inputs available to the multiplexers MX1–MX4.

Figure 16F:
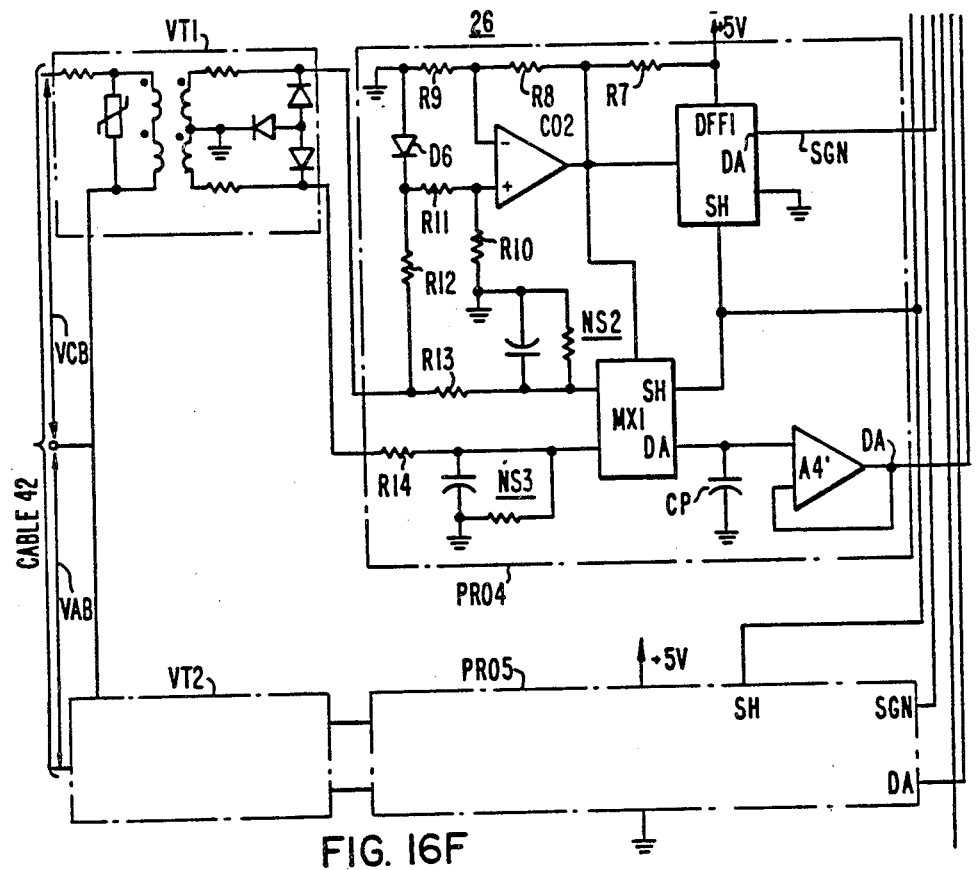
Figure 16G:
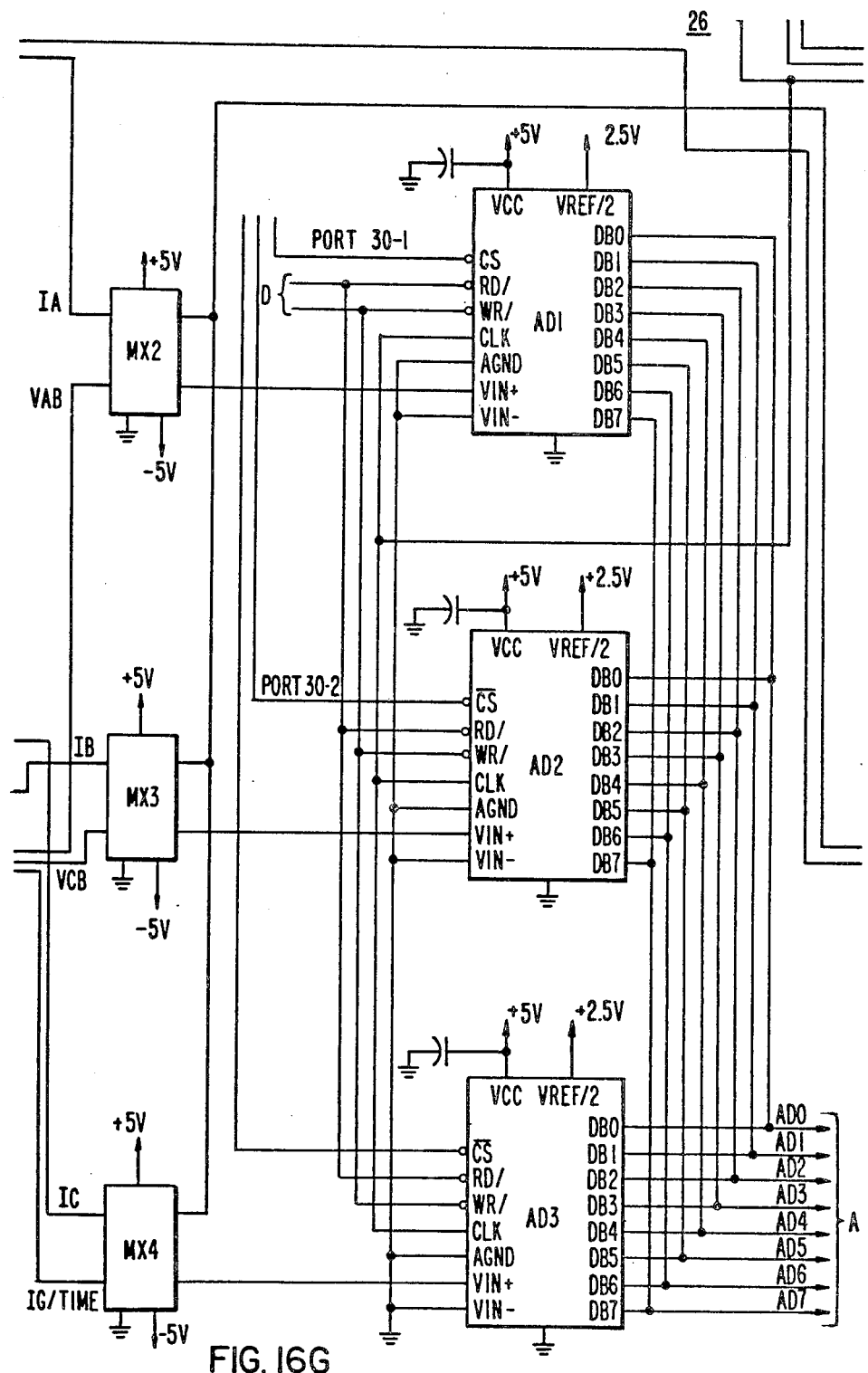
Figure 18:
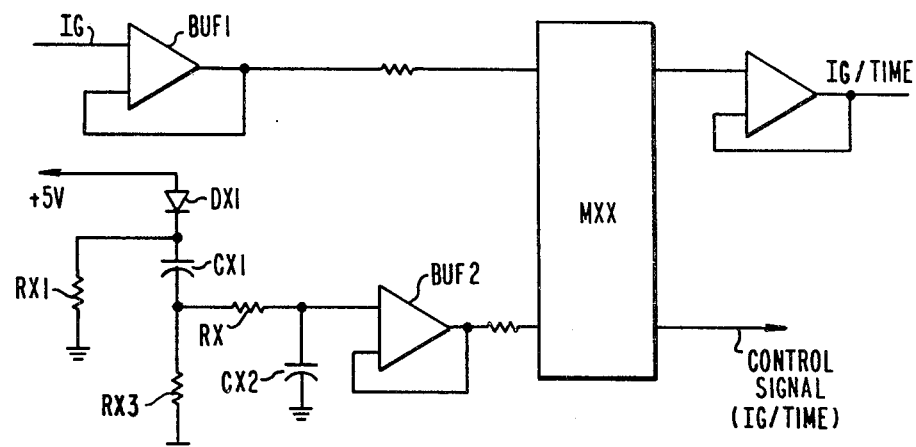
FIG. 18 shows a circuit utilizable to measure ground current or alternatively, upon command, to determine how long the contacts of the motor starter have been opened.

Referring now more specifically to FIG. 16F, an analog voltage detecting and processing network is shown. In particular, the voltages VCB and VAB are provided by way of cable 42 as is best shown in FIG. 2 to the control unit 26. The voltage VCB is provided to the input terminals of a voltage transformer network VT1 and the voltage VAB is provided by way of appropriate input terminals to an identical voltage transformer network VT2. The voltage transformer networks VT1 and VT2 provide center tap voltages to the processors PRO4 and PRO5, respectively. With respect to processor PRO4, like-identified portions thereof are similar to like-identified portions described with respect to the processor PRO1. The operation is essentially the same as that described with respect to processor PRO1. Noise suppressing circuits NS2 and NS3 are provided where they weren't provided with respect to processor PRO1. Furthermore, where is no need for the resistive element R1 which changes current to voltages as the voltage is already present. Also, the follower FL1 is not necessary because the center tap arrangement of the voltage transformer VT1, for example, provides appropriately oriented voltages to the multiplexer MX1. In addition, no ranging is necessary or desirable in this case and consequently, the amplifier A4' which cooperates with the capacitive element CP to hold the signal provided at the data output of the multiplexer has no ranging control. Once again, the sign of the polarity of the input voltage signal is provided at the sign output SGN of the processor PRO4 while the data output or magnitude output is provided as a level at the output terminal DA of processor PRO4. Voltage transformer VT2 cooperates with processor PRO5 in an identical manner.

Referring once again to FIGS. 16E, 16F and 16G in conjunction, it can be seen that the sign value for the currents IA, IB, IC, the voltages VCB and VAB are provided to terminals PA0 through PA4 of the electrical programmable read-only memory EP5. The magnitude of the voltage VCB is provided as the second input for the multiplexer MX3 and the magnitude of the voltage VAB is provided as the second input for the multiplexer MX2. It can be seen that four different reading cycles must be made to gather all of the necessary information for a complete analog-to-digital conversion of one full wave of input current and voltage. In the first reading, all of the positive input currents IA, IB and IC are provided to the A to D converters MX2–MX4. In the second reading the associated positive voltages VAB and VCB, as well as the ground fault current level IG is provided to the A to D converters MX2–MX4. In the third reading, all the negative values of current IA, IB and IC are provided to the A to D converters MX2–MX4, and in the last reading, the corresponding values of negative voltage VAB, VCB and the level of the ground fault current IG is provided to the A to D converters MX2–MX4.

Figure 5:
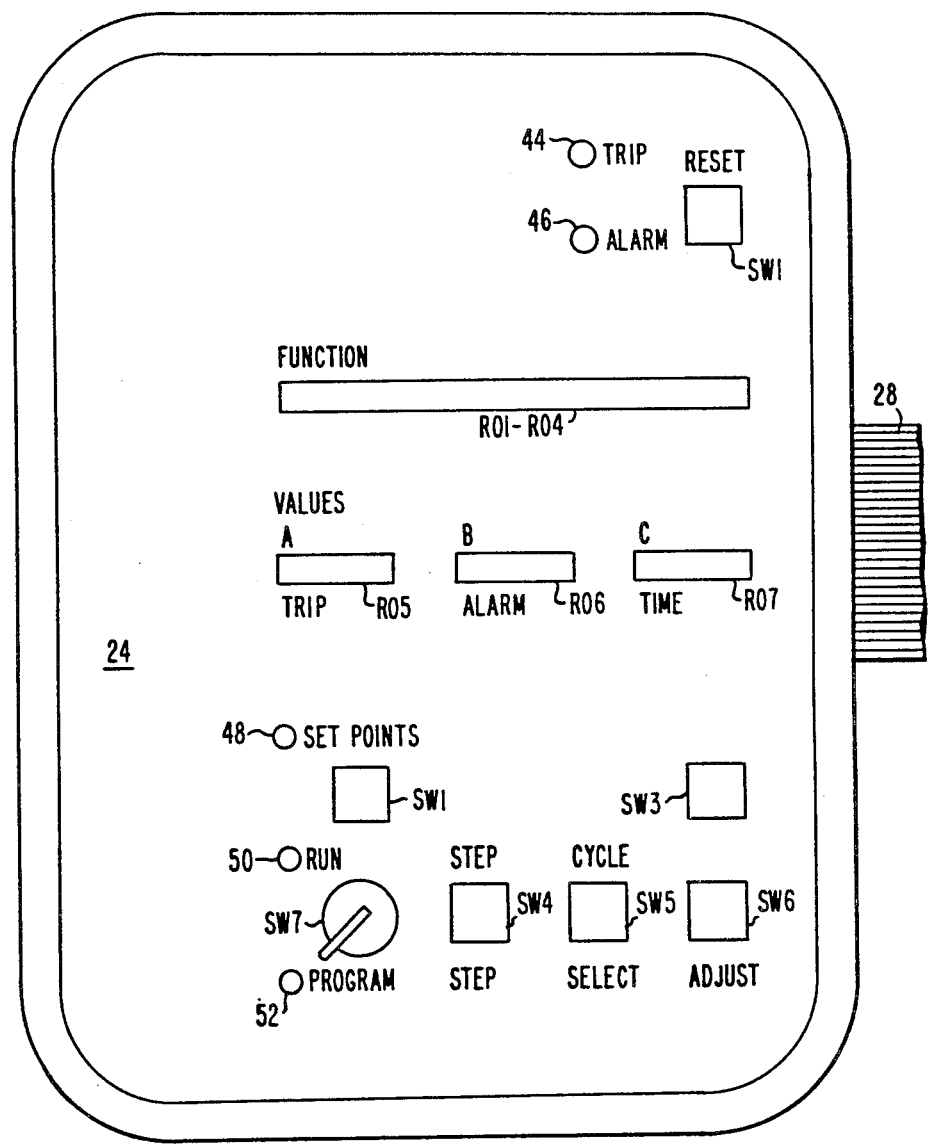
FIG. 5 shows a representation of the front control panel for the motor controller of FIG. 1.

Referring now to FIGS. 6A, 6B, 6C, 16E, 16F and 16H as well as FIG. 5, the interrelationship of the front panel 24 and various elements within the control unit 26 are depicted and described. Switch SW1 is connected at one side thereof to ground and at the other side thereof to an appropriate line in cable 28 and one side of a resistive element R, the other side of which is connected to a five volt power supply. The latter-mentioned wire in cable 28 is interconnected with terminal PB7 of the electrically programmable read-only memory EP5. When switch S1 is open, the latter-mentioned wire has a five volt value thereon relative to ground which constitutes a digital one. When switch SW1 is closed, the latter-mentioned wire is essentially grounded constituting a digital zero. Therefore, a digital one or a digital zero exists on terminal PB7 depending upon whether switch SW1 is opened or closed. The electrically programmable read-only memory EP5 then cooperates with the microprocessor and other portions of the control unit 26 to utilize this information for purposes and in a way which will be described hereinafter. Switches SW2 through SW7 are interconnected by way of wires in cable 28 with terminals PB5, PB1, PB4, PB3, PB2 and PB0 of device EP5. It is to be noted that switch SW7 is a single pole, double throw switch which can be placed in either the RUN position or the program position PROGRAM. With respect to FIG. 5, the following legends are indicated in white on the actual embodiment of the invention "CYCLE", "STEP", "RUN", "VALUES A" "VALUES B" and "VALUES C". On the other hand, the following legends are printed in blue on the actual embodiments: "TRIP", "ALARM", "TIME", "PROGRAM", "STEP", "SELECT", and "ADJUST". Furthermore, the "FUNCTION" legend, the "TRIP" legend, the "ALARM" legend, and the "RESET" legend are also printed in white. If the key-operated two-position access switch SW7, "RUN", "PROGRAM" is placed in the RUN position, the actual reading of electrical parameters such as voltage, current, etc. can be displayed for review. However, the setpoints cannot be changed unless the aforementioned key switch SW7 is moved into the PROGRAM position. If an "ALARM" or "TRIP" condition occurs while switch SW7 is in the run mode, the review functions are electrically preempted and the display (FUNCTION) shows that an ALARM or a TRIP has occurred and furthermore, the alarm lamp 46 flashes. If the key switch SW7 is in the PROGRAM mode, the motor cannot be started. On the other hand, if the motor is running, and the key switch is placed in the PROGRAM mode, the programming as described hereinafter will have no affect until a stop condition occurs. The "STEP" push-button will change the function displayed in the appropriate read-out or display and hold it until the "STEP" push-button is operated again. As the appropriate function appears in the "FUNCTION" readout, values will also appear in combinations of the "A", "B", and "C" readouts and will remain therein until the "STEP" pushbutton is operated again. If switch SW7 is in the RUN mode, the numerical values shown in the "A", "B" and "C" readouts are actual readings of the function in question. If, at the same time, the "SETPOINT" button SW2 is actuated, the values displayed for any function in the displays "A", "B", "C" will be the "TRIP", "ALARM" and "TIME" values previously entered by an operator. If the "CYCLE" pushbutton SW5 is energized, whatever is displayed in the "FUNCTION" read-out and the values "A", "B", "C" will iterate through the entire menu of possible functions for either monitored values if the "SETPOINT" switch SW2 has not been actuated or will show the preset values "TRIP", "ALARM", "TIME" if the setpoints which SW2 has been actuated. If the switch SW7 is placed in the PROGRAM mode, then utilization of switch SW5 will cause a selection of values in either the "TRIP" readout, "ALARM" readout, or "TIME" readout for adjustment by appropriate manipulation of the up switch SW3 or the down switch SW6. Utilization of the up switch SW3 will cause the appropriately displayed value in either "TRIP", "ALARM", or "TIME" to change by a predetermined increment in an upward direction. Conversely, utilization of the down switch SW6 under the same conditions will cause the same function to change downwardly by a predetermined amount. Therefore, it can be seen that the "ADJUST" pushbuttons up and down can change the program previously entered into control unit 26. The "RESET" pushbutton must be operated to reset the unit and turn off the "TRIP" light 49. The "ALARM" light 46, on the other hand, extinguishes if a function value drops below an alarm level. It can be seen, therefore, that the front panel 24 provides two distinct functions, one of programming and one of monitoring. When the key swtich SW7 is in the RUN mode, basically a monitoring function takes place. However, if the key switch is thrown into the PROGRAM mode, then a programming function can take place by utilizing the adjust pushbuttons SW3 for "UP" and SW6 for "DOWN".

Figure 6A:
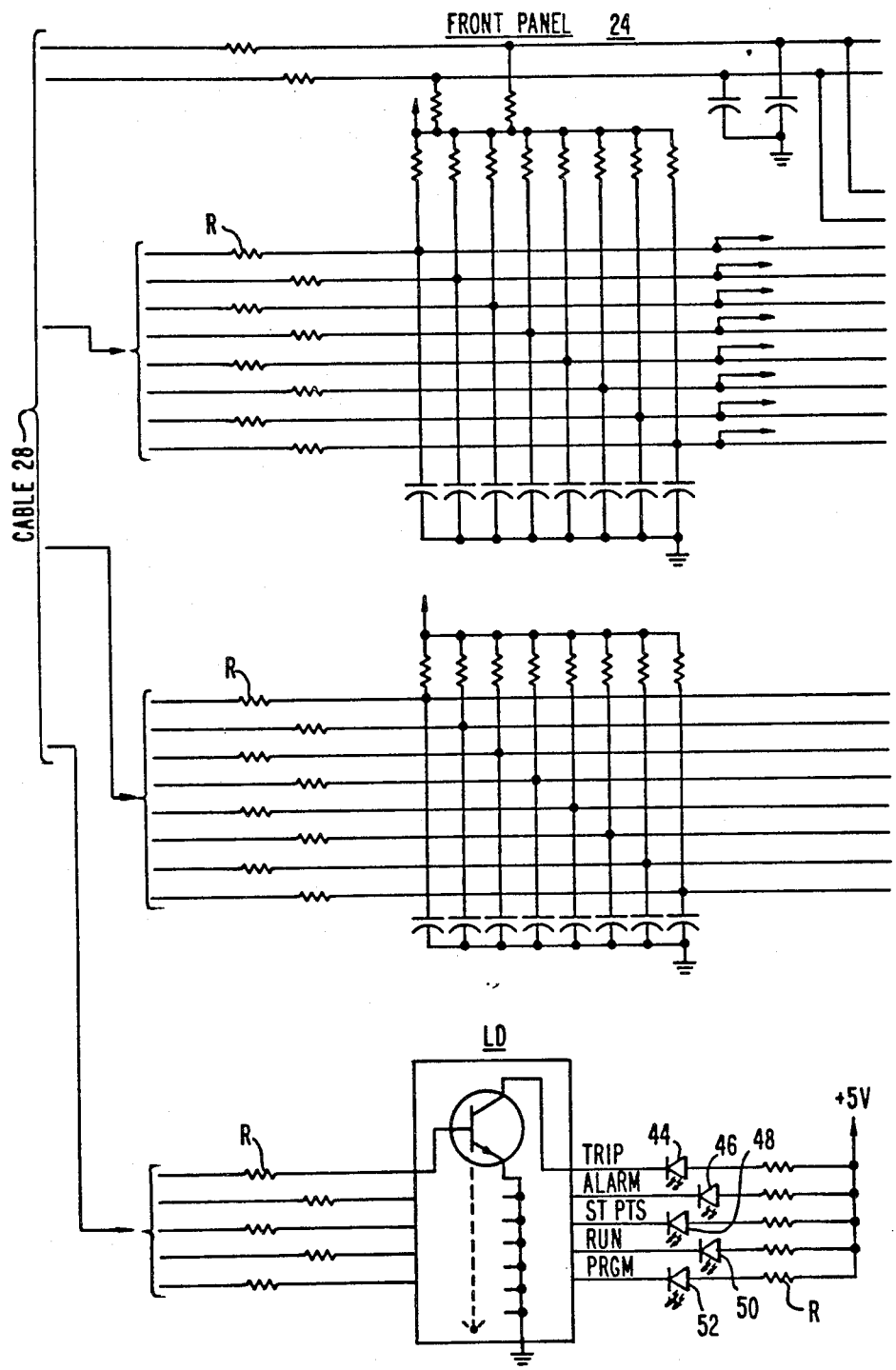
FIGS. 6A through 6C show a schematic diagram of the elements depicted on the front panel of FIG. 5. Some of the elements are in block diagram or functional representation form.
Figure 6B:
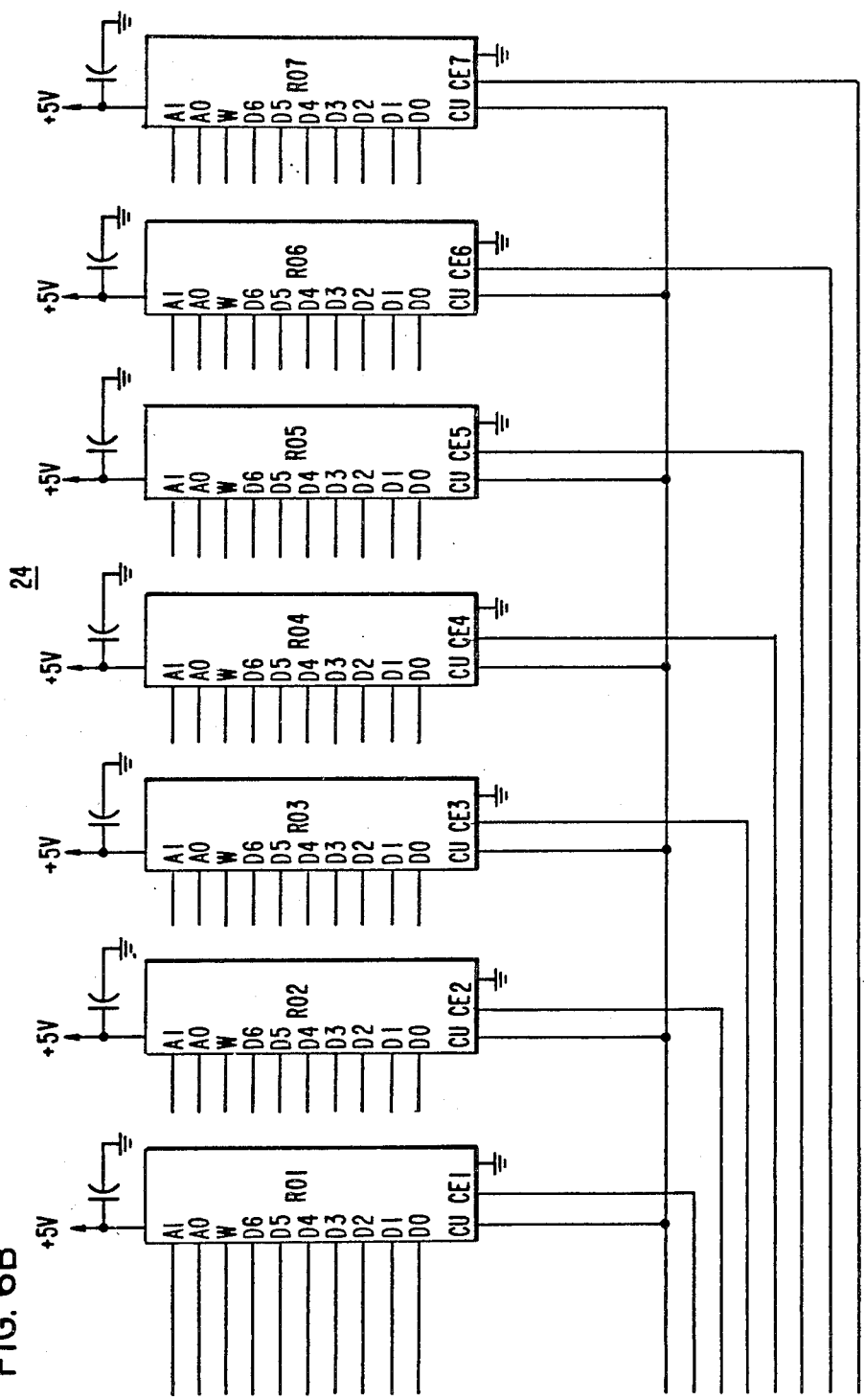
Figure 6C:
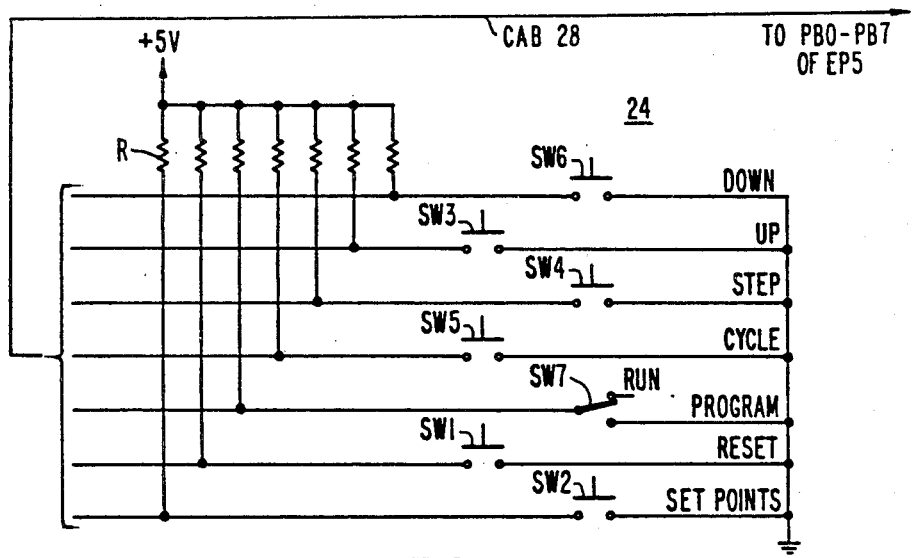
Figure 15:
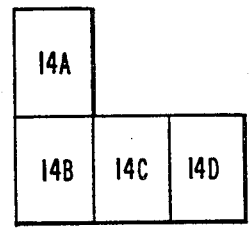
FIG. 15 shows the appropriate lay-out arrangement of FIGS. 14A through 14D.
Figure 17:
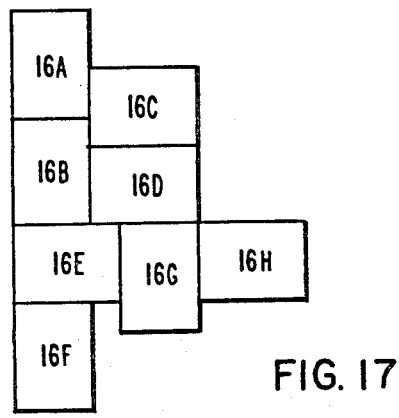
FIG. 17 shows the appropriate lay-out arrangement of FIGS. 16A through 16H.

Specific reference to FIGS. 6A, 6B and 16H will show how the various lights and readouts are interrelated with a volatile random access memory device VR2. Various input/output terminals of the random access memory VR2 are connected with readout or illuminating portions on the front panel 24. For example, terminals PA0 through PA6 on device VR2 are interconnected with terminals D0 through D6 on each of the seven read-out devices RO1 through RO7 of the front panel 24. Once the information is sequentially stored in each one of these readout devices, it is displayed continuously. The storing of information in the readout devices is accomplished by sequentially selecting a chip enable CE terminal for any one of devices RO1 through RO7 and then digitally actuating terminals A1 and A0 of the same devices to pick one of the four lamps therein for loading. Consequently, loading of the lamp systems is in series, but the readouts appear to display in parallel. The chip enable terminals are selected by way of terminals PB0 through PB6 of the device VR2. Furthermore, data is loaded into the devices RO1 through RO7 when the terminal PA7 is actuated in the device VR2. This is a white terminal and is designated W. With respect to the LED readouts 44–52, it will be noted that there are five such readouts. LED readouts 44, 46, 48, 50 and 52 are connected by way of a resistor R to a five volt power supply at one end thereof and to a lamp driving circuit LD at the other end thereof. Appropriate current limiting resistors R are connected by way of cable 28 to appropriate terminals on the random access memory VR2. LED 44 Is interconnected with output terminal PC4. LED 46 is interconnected with output terminal PC3. LED 48 is interconnected with output terminal PC2. LED 50 is interconnected with output terminal PC1 and LED 52 is interconnected with output terminal PC0. The random access memory VR2 is of the type disclosed in the previously-mentioned INTEL User's Manual on pages 517–530 and is of the particular kind designated "8155". Consequently, that portion of the INTEL Booklet, as previously described, is incorporated herein by reference.

The actal functions in the menu of functions to be monitored by the front panel 24 is listed hereinafter in Table I. With the "A", "B" and "C" values aligned in appropriate columns.

TABLE I

| METERING | | | |
|---|---|---|---|
| | A | B | C |
| Line Voltage | X | X | X |
| Motor Current - A | X | X | X |
| Motor Current - % | X | X | X |
| Ground Current - A | X | | |
| Winding Temperature - C. | X | | |
| Motor Brg. Temperature - C. | X | X | |
| Load Brg. Temperature - C. | X | X | |
| Kilowatts | X | | |
| Kilovars | X | | |
| Power Factor - % | X | | |
| Frequency | X | | |
| Kilowatt Hours | X | | |
| Run Time | X | | |
| Operations - Count | X | | |

TABLE II

| PROGRAMMABLE SETPOINTS OR VALUES | | | |
|---|---|---|---|
| | TRIP | ALARM | TIME/VALUE |
| Winding Temperature | X | X | |
| Motor Brg. Temperature | X | X | |
| Load Brg. Temperature | X | X | |
| Ground Fault | X | X | X |
| Inst. Overcurrent | X | | |
| Locked Rotor Cur | X | | X |
| Long Accelerate | X | | X |
| Jam | X | | X |
| Underload - Start | | | X |
| Underload - Run | X | | X |
| Ultimate Trip | X | | |
| Overvoltage | X | | X |
| Undervoltage | X | | X |
| Timer 1 | | | X |
| Timer 2 | | | X |
| Timer 3 | | | X |
| Incmplt. Sequence | | | X |
| Anti-Backspin | | | X |
| Anti-Recycle | | | X |
| Start Counts/Hrs. | X | | X |
| Time Under Volt | | | X |
| Open/Unbal. Phase | | X | X |
| Full Load Cur-A | | | X |
| C. T. Ratio | | | X |
| P. T. Ratio | | | X |
| Starter Class | | X | X |

Further examination of the control unit 26 especially with regard to FIGS. 16C, D, G and H will reveal further details of the construction and operation of the central processing unit 26. For instance, there is provided a microprocessor MP which, in a preferred embodiment of the invention is of the type designated in the previously-described Intel ® MCS-85 ® User's Manual on pages 5-1 through 5-16 thereof, the latter is incorporated by reference herein for convenience and clarity. The terminals AD0 through AD7 represent address and data transfer of points which are eight bits wide. They are commonly designated by the symbol A. It will be noted that these terminals are interconnected with like terminals on the electrically programmable read-only memories EP1 through EP5, the volatile random access memories VR1 and VR2 and three A to D converters AD1, AD2 and AD3 at terminals DB0 through DB7, respectively. These terminals are utilized to address locations in the variously-mentioned devices and to transfer data back and forth between the devices.

It is to be noted that terminals A8, A9 and A10 jointly designated as "B" are interconnected with the five previously-described electrically programmable read-only memories EP1 through EP5 for further addressing of these devices. Terminals IO/M, ALE, and RST OUT are designated by the reference signal C and they also interconnect at like locations on the five previously-described electrically programmable read-only memories plus similar locations on the volatile random access memories VR1 and VR2. The terminals designated RD and WR are collectively designated D and they are routed to the aforementioned electrically programmable read-only memories and the volatile random access memories. The terminals designated A11 through A14 are routed to a pair of address decoders DE1 and DE2, respectively. Terminals A11, A12 and A13 of the microprocessor MT are interconnected with terminals A0, A1 and A2 of both of the decoders DE1 and DE2 while the terminals A14 and A15 of the microprocessor MT are connected to terminals E2 and E1 of decoder DE1 and E3 and E1, respectively, of decoder DE2. The output terminals 0 through 7 of decoder DE1 are designated CS0 through CS5 PORT 30-1 and PORT 30-2, respectively, and they are routed to devices EP2, EP4, EP5, EP1, VR1, VR2, AD1 and AD2, respectively, for selecting any one of those devices for functional utilization by the microprocessor MP. The output terminals 0 and 1 of decoder DE2 are designated PORT 40-3 and CE2, respectively, for routing to device AD3 and device EP3 (signal CE2), respectively. The microprocessor has interconnected at terminals X1 and X2 a 60 mHz crystal for providing a 3 mHz output at the CLKOUT terminal thereof. There are three terminals shown to the left of the microprocessor MP designated RST, $\overline{\text{RESET}}$ and TRAP. All of the functions of the microprocessor MP are described in the previously-mentioned Intel ® Manual as previously described. Three A to D converters designated AD1, AD2 and AD3, respectively, are shown. Each of these devices is interconnected with a multiplexer MX2, MX3 and MX4, respectively, at the VIN+ input terminals of the respective A to D devices. The multiplexers are interconnected as was described previously and the multiplex selection is controlled by the PC3 output terminal of the volatile random access memory VR1 of FIG. 16H. Similarly, the sample and hold signal so well utilized with respect to the devices of FIG. 16E at the input terminals SH of the same devices is generated at the output terminal PC4 of the memory VR1 of FIG. 16H. The top input terminals of the multiplexers MX2, MX3 and MX4 are levels IA, IB and IC, respectively, as was described previously. The bottom input terminals of the same-mentioned multiplexers are voltages VAB, VAC and ground fault current IG, respectively. In the manner previously described, these latter signals are sent to the appropriate A to D converters where levels representative thereof are converted at the terminals DB0 through DB7 in each case to digital values for subsequent routing to the microprocessor MP and other appropriate memory locations thereafter with appropriate processing in the interim. The various A to D converters AD1 through AD3 are selected by the previously-described signals PORT 30-1, PORT 30-2, and PORT 40-3, respectively, and by the read-write signals designated D with respect to the multiplexer MP in FIG. 16C. The A to D converters therefore provide the valuable function of converting the analog signals shown entering the control unit 26 of FIG. 2 (the current signals IA, IB, IC and IG, and the voltage signals VCB and VAB) into digital values for appropriate utilization. It will be recalled with respect to device VR2 that it is interconnected with appropriate front panel locations on FIGS. 6A and 6B. The non-volatile read-only memory NVR is connected at output terminals D0 through D7 to terminals PA0 through P7 of device VR1. Likewise, terminals A01 through A5 of device NVR are connected to terminals PB1 through PB5 of device VR1. Finally, terminals C1, C2 and CLK of the device NVR are interconnected with terminals PB6, PB7 and PC0 of VR1. The terminals PC1 and PC2 of VR1 are connected to the terminals A0 and A1 in the devices RO1 through RO7 in FIG. 6B for selecting which of the four indicating lamps are to be loaded with data in each case in those latter devices. The terminal designated T/OUT/ in device VR1 is interconnected with terminal T/IN in device VR2 and with the previously-described input terminal RST 7.5 of the microprocessor MP. The signal T/OUT/ of device VR1 generates a pulse to the aforementioned terminal T/IN and to the terminal RST 7.5 of the microprocessor MP for initiating a 5.56 ms cycle in the microprocessor.

The 3 megahertz clock output signal CLK OUT from the device MP is routed to the clock input terminals of the electrically programmable read-only memories EP1 through EP5 and to a divide by 8 counter designated DV where it is provided to the clock input terminals of the A to D devices AD1 through AD3 for causing those devices to sample input data from the previously-described multiplexers MX2 through MX4 at a slower rate. Generally, the rate is such that all of the appropriate parameters are sampled and digitized three times per cycle within a 12 line cycle time frame. The latter-mentioned divide by eight signal is also provided to the terminal T/IN of the device VR1 for utilization. Here it is utilized at the previously-described terminals PC3 and PC4 for determining sample and hold rate and multiplexer rate for the devices of FIG. 16F and the multiplexers of FIG. 16G.

Referring once again to FIG. 16D, the POWER ON RESET, DEAD MAN and EMERGENCY STOP, the output terminal of the NAND gate NA1 as connected to the RST1 input terminal of the flip flop FF1 and to the RST2 input terminal of the flip flop FF2. The Q1 output terminal of the flip flop FF1 is designated ESO. It is connected to the PA6 input terminal of the electrically programmable read-only memory device EP4 of FIG. 16A. The output terminal Q2 of the flip flop FF2 is connected to the field effects transformer FEX3. A relay coil COES is connected at one end thereof to an appropriate point on the field effects transformer FEX3 and at the other end thereof to a 12 volt power supply 12 VEX. The latter relay coil is protected by a suitable diode and drives the emergency stop relay, E-STOP REL, also shown in FIG. 2. The signal E is connected to one input terminal of the NAND gate NA1 and the signal E-stop is connected to the other input terminal thereof. The signal RESET is connected to one input terminal of the NAND gate NA2 and the signal TRIP-RESET is connected to the other input terminal thereof. The signal E comes from the PB4 terminal of the electrically programmable read-only memory EP2 of FIG. 16B. The signal E-STOP comes from the output amplifier A2 of FIG. 16A. All of the inputs E, E-STOP, RESET, and TRIP-RESET when changed from a digital high to a digital low which is indicative of a need to energize E-STOP REL, will cause a digital one to appear on the output terminals of either of the NAND gates NA1 or NA2. Either or both of these signals will cause the Q2 output terminal of the flip flop FF2 to go high, thus causing the field effects transistor FEX3 to go low, thus energizing the coil COES, thus appropriately closing the E-STOP REL contact. Furthermore, the presence of a signal that goes from zero to high on the output of NAND gate NA2 will cause the Q1 output of the flip flop FF1 to go high, thus causing output signal ESO to be high. Conversely, in the presence of a high on the output of a NAND gate NA1 will cause the reset terminal RST1 of the flip flop FF1 to go high thus causing the output Q1 to go low, thus causing the signal ESO to go low.

As is also shown in FIG. 16D, a POWER ON RESET circuit and a DEAD MAN circuit are available for use by the microprocessor MP. The RESET signal is provided to the $\overline{RESET}$ input of the microprocessor and to the CS1 input terminal of the non-volatile read-only memory NVR of FIG. 16H. The RESET signal is designed to be produced when either the 12 volt power supply or the 5 volt power supply which is utilized for empowering many of the elements of central processor unit 26 are low. A comparator CO3 has both the 5 volt and 12 volt power supply connected thereto through the diodes D7 and D8 to provide operation from either of the power supplies. A precision 2.5 Zener diode PSZ is connected to the negative input of the comparator CO3. The positive input of the comparator CO3 has a 2.7 voltage reference established thereat which is derived from the 5 volt power supply. If the 5 volt power supply falls below 4.56 volts, which is an indication of a problem in the power supply, the output of the comparator CO3 pulls the + input of the next comparator CO4 low. There is a 15 ms time constant associated with this change of state. The time constant is a function of a capacitor CPS1 and RPS1 working as a charging network. Furthermore, comparator CO4 compares the latter-mentioned signal with the 2.5 volt reference signal once again. If the 5 volt power supply is low, the output of the comparator CO4 will go low from a high impedance state to produce the aforementioned RESET signal. This RESET signal is used to initiate several responses. The signal is used to chip select inputs on NVR to prevent writing or reading from this component during the reset phase. The RESET is used in the emergency stop relaying circuit EMG STOP and the RESET signal is sent to the microprocessor MP to set the internal program counter thereof to zero to start the program from the beginning as will be described hereinafter. The RESET signal is also used to generate what is called a DEAD MAN signal to provide input to the TRAP input of the microprocessor MP. To accomplish this, the RESET signal is applied to the positive input of a comparator CO5 to produce a low signal at the output thereof during a RESET condition. The latter output is wired OR-ed with the output from a comparator CO6. This comparator compares the sample and hold signal which was described previously with the 2.5 voltage reference. The sample and hold signal is ideally a pulse which is produced every 5.56 ms. This pulse is used for sampling of data and is a good indication whether the microprocessor is working intelligently or not. The absence of this signal indicates that the microprocessor is likely not to be working intelligently. The output of comparator CO6 has a time constant of approximately 20 ms associated with it which is a function of the capacitance of capacitive element CD1 and interconnected resistance. This latter output is compared to the 2.5 volt signal at the comparator CO7. This output is wire OR-ed with the output of comparator CO8 which compares the output signal from CO6 with an eight volt reference. In the final stage of the DEAD MAN, the output of the comparator CO9 will be low if there has been a loss of intelligence. If there is no loss of intelligence in the microprocessor MP, the voltage at the negative input of comparator CO9 will be more positive than the voltage at the positive input thereof and the output of CO9 will be zero. This means that the output of the comparator CO9 will become a free-running or astable multi-vibrator as a function of the capacitive element CP3 and the resistance RD1. If the input to the negative terminal of comparator CO9 is less positive than the voltage at the positive terminal thereof, the outputs of the comparator CO9 will stay at a high impedance. This allows capacitive element CD1 to charge and increase the voltage at the negative input terminal to make it more positive than the positive input terminal and thus cause the comparator CO9 to trigger. The time needed for capacitive element CD1 to charge and discharge determines the frequency of the multivibrator. It is approximately equal to two times the resistance RD1 times the capacitance of CD1. The time is ideally 94 ms in the preferred embodiment of the invention. This latter signal is recognized on the TRAP input of the microprocessor MP by its rising edge and high level. There is a 50% duty cycle with this signal which means that the microprocessor has approximately 50 ms to correct its errors during each duty cycle.

A capacitor-backed random access memory (RAM) of the CMOS type, the latter device designated CRAM has the signals AD0 through AD7 connected to the right portion thereof in a manner previously described with respect to other random access memories. Three inputs are connected to the left of the device CRAM, namely an uncontrolled 5 volt signal at input terminal CS2, a read-write signal WR at input point WR and a control signal from a control unit CONC at input terminal CS1. Control unit CONC has connected thereto four types of input signal, namely the signal CS12 from the device DET of FIG. 16C, the signal ALE, the read-write signal WR referred to previously and the reset signal RESET signal described previously. In addition, a 12-volt power supply signal is provided and a 5-volt power supply signal is provided. The 5-volt power supply signal is provided by way of diode DY1 to a large capacitor sometimes known as a super capacitor SUCP. The supercapacitor is isolated from the VCC voltage power supply terminal of the random access memory CRAM by way of diode DY2. The supercapacitor is also interconnected to the VCON input terminal VCON of the control element CONC. The capacitive element SUCP acts to keep power from the power supply terminal VCC of the random access memory CRAM. This memory is utilized to store important information concerning the status of the motor at any time. It also contains flag information related to certain portions of subroutines, which are utilized in the microprocessor. The capacitor SUCP is utilized in an attempt to guarantee that the information will be saved even though the power supply voltage drops off. Normally, a lowering of voltage below a certain predetermined level on the input terminal VCC of the CRAM device would render that device unreliable as a storage receptacle for data. As will be described hereinafter with respect to FIG. 20, check sum CKSUM subroutine is utilized to determine if the information in the random access memory CRAM is reliable after the power supply voltage has dropped. Generally, the information will be reliable if the capacitive element SUCP has not discharged, thus rendering the voltage at the terminal VCC lower than is allowed. The information stored in device CRAM is utilized in a routine designated SETPT1 in FIG. 20 to essentially cause the microprocessor to be placed in a subroutine or operating disposition related to the disposition the motor was in at the time that the power outage occurred.

Figure 19:
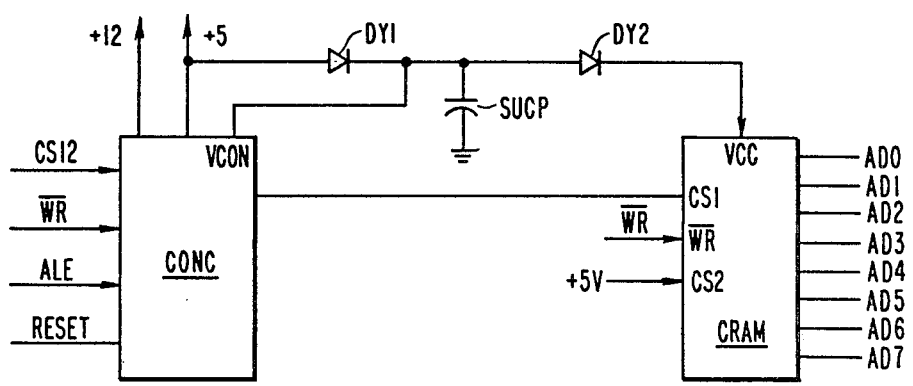
FIG. 19 shows a CMOS RAM having a control circuit and power supply backed by a capacitor.
Figure 20:
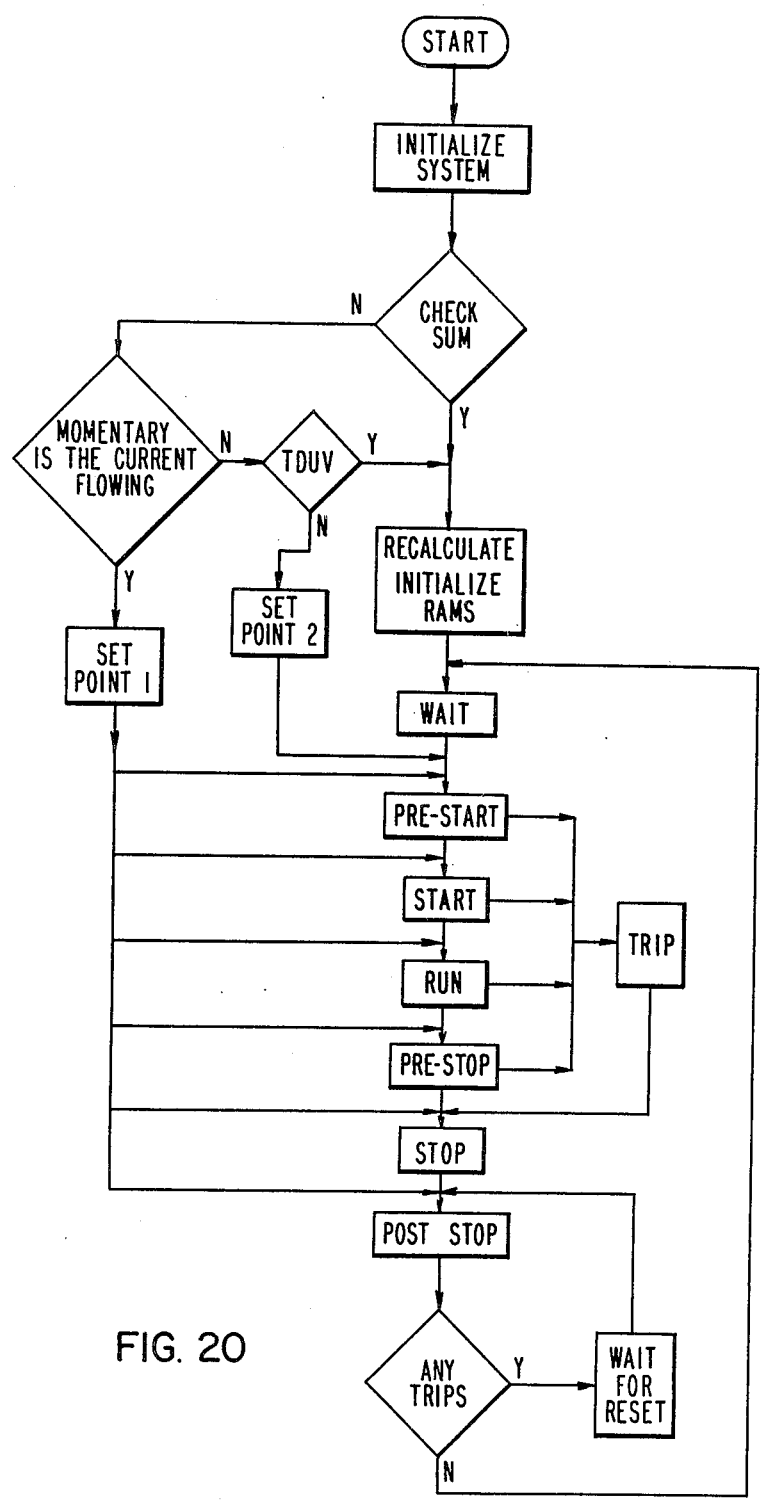
FIG. 20 shows a block diagram of the routine the microprocessor automatically utilizes in the event that a RESET signal is present.

Referring now to FIG. 20, a subroutine is shown for utilization in the microprocessor MP of FIG. 16C which determines whether the microprocessor must be initialized to the 00 (zero-zero) starting point therein after a drop in the power supply voltage. As was described previously with respect to the RESET signal, a situation may exist where it is necessary to place the microprocessor in an initial state. This necessitates shutting the motor down, that is, opening the contacts M1, M2 and M3 as shown in FIG. 2. As was described previously with respect to FIG. 16D, the reset signal is sent to the microprocessor MP to set the internal program counter thereof to 0 to start the program from the beginning. This is represented by the START block in FIG. 20. The microprocessor then goes to the INITIALIZE SYSTEM block where hardware related functions are initiated. It is used to program timers and place steady state values on certain ports in the microprocessor. Next, the CKSUM routine is utilized. This CKSUM routine checks the sum of critical values stored in the previously described random access memory CRAM. If the sum is now the same as it was before the power drop, the implication can be made that there has been a power loss but the CRAM memory is not faulty. The CRAM memory would not be faulty if the capacitor SUCP of FIG. 19 had maintained the 5 volt at the power supply terminal VCC of the CRAM element. If the CKSUM routine indicates that there has been a power loss but the memory is not faulty, then the MOMENTARY block of FIG. 20 is utilized. The question asked there is, "Is there current flowing in the lines L1, L2 and L3 of FIG. 2?" If current is flowing, the implication is that the contacts M1, M2 and M3 are closed and the motor therefore is still running. The currents measured are currents IA, IB and IC, which have been previously supplied to multiplexers MX2, MX3 and MX4 of FIG. 16G and utilized in a manner similar to that previously described. If the contacts are closed, as can be implied by the presence of the current, then the SETPOINT 1 routine is utilized. It essentially specifically initializes portions of the microprocessor by utilizing data in the CRAM to determine where in the routine of FIG. 20 the program should proceed to. It also provides a signal to the microprocessor which aborts a signal which had been previously provided by the INITIALIZE SYSTEM block which had instructed the contacts M1, M2 and M3 to open. Because of the mass of the contacts, the contacts will not have been opened before the latter abortive signal is provided to the microprocessor. Depending upon the information stored in the CRAM, the microprocessor will assume the status it had been in previous to the power supply voltage drop. The status may be PRESTART, which represents the prestart condition, START, RUN, PRESTOP, which represents the prestop condition, STOP or POSTSTOP, all of which have been described previously. If the MOMENTARY block determines that the contacts are open by noting the absence of current flow, then the TDUV (time delay undervoltage) block will be utilized. This block causes the microprocessor to alert the device EP1 to send a signal to the multiplexer MXX to measure the voltage at the lower input terminal thereof rather than to measure the ground current. This information is provided to multiplexer MX4 and to the device AD3 for use by the microprocessor in determining whether an operator programmable time for undervoltage has been exceeded or not. If the time has been exceeded then the routine of FIG. 20 is moved to the RECALCULATE block at which point in the routine displays are initialized, setpoints are recalculated and the motor is stopped. This RECALCULATE routine is also utilized if it turns out that the CKSUM routine described previously shows that the sum stored in the appropriate locations of the CRAM is not equal to the previously stored reference sum. If on the other hand the TDUV routine shows that the preset time has not been exceeded, then the SETPOINT 2 routine will be utilized to automatically restart the motor. The routine will move to a point before the PRESTART location shown in FIG. 20. If the RECALCULATE routine had been used, then a manual operator restart of the motor would be required. The WAIT subroutine which preceeds the PRESTART routine is utilized to take data every 120 electrical degrees or 5.5 milliseconds for a 60 Hz signal. Anywhere in the routine's PRESTART, START, RUN or PRESTOP subroutines a TRIP action or routine may take place by which the motor is stopped. Once the POSTSTOP routine is reached, the question is asked whether any trips have occurred. If the answer is "Yes", then it is necessary to wait for a manual RESET action by the operator, as described previously, before further utilization of the routine of FIG. 20 can take place. If on the other hand there were no trips, then the routine will move to a place prior to the WAIT subroutine, thus requiring operator positive manual restart for the motor to once again run.

Figure 14A:
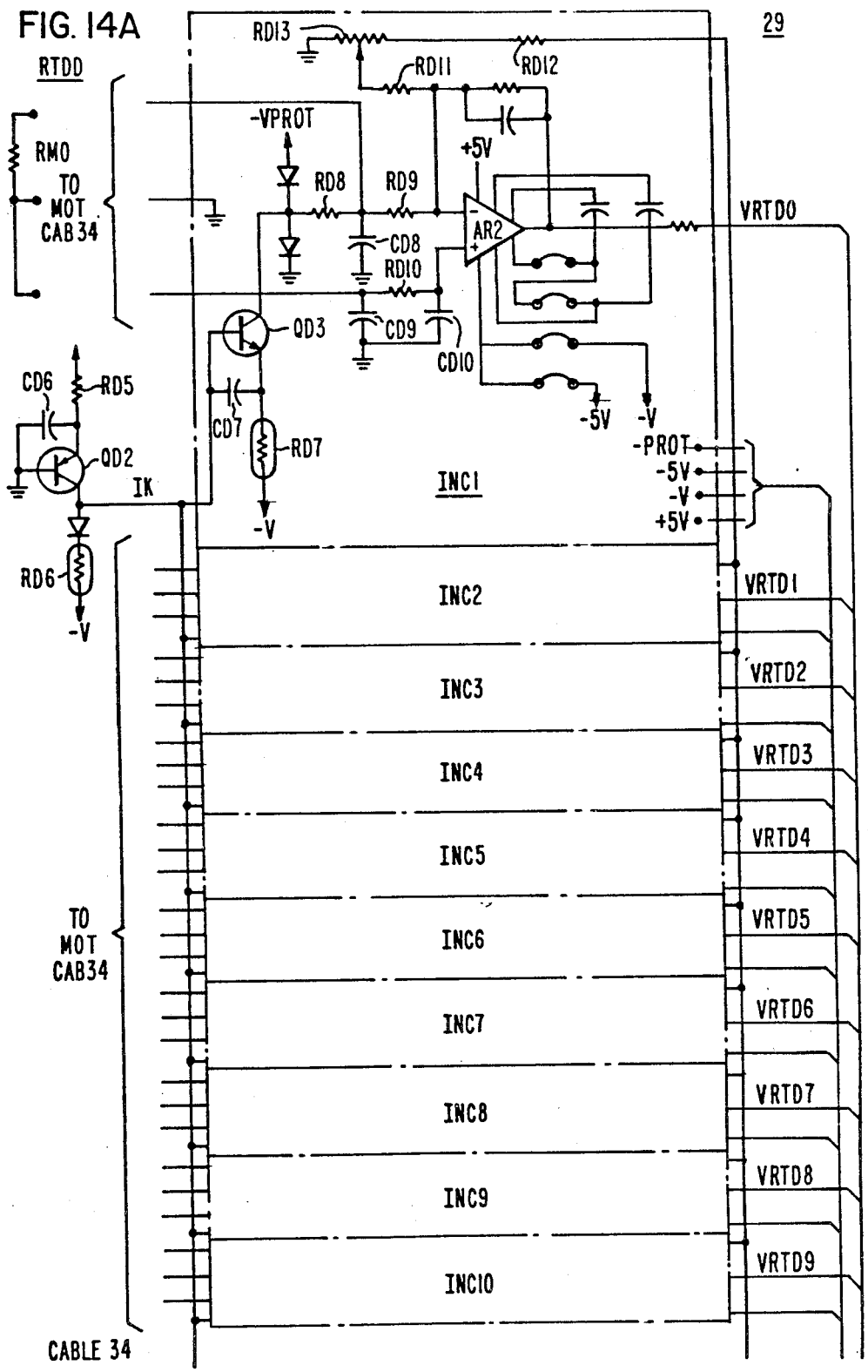
FIGS. 14A through 14D show a circuit diagram partially in schematic form, partially in block diagram form and partially in circuit function form for the "RTD unit" 28 of FIG. 2.
Figure 14B:
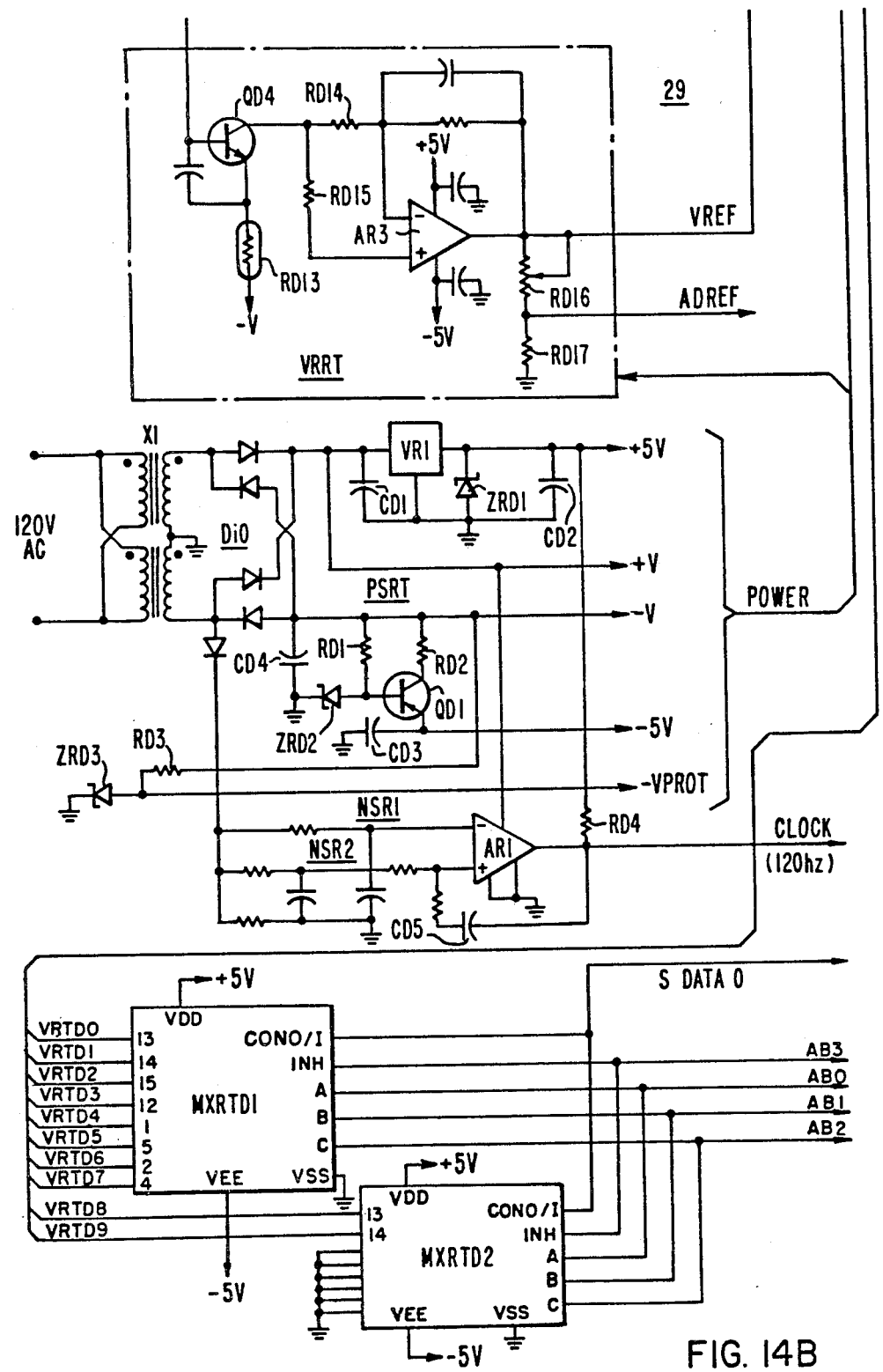

Referring now to FIGS. 14A through 14B, the resistance temperature detector circuit or resistance temperature detector (RTD) unit 29 of FIG. 2 is shown. It is to be noted that the resistor temperature detector devices are remotely located at the regions of the bearings and field windings for example of the motor MOT. An exemplary resistance temperature device RTDD is shown in the upper left of FIG. 14A. It comprises a three-terminal network which is interconnected with three appropriate terminals in the unit 29 by way of cable 34. The output from the resistance temperature device unit 29 is interconnected with the control unit 26 by way of the cable 31 shown in the upper right of FIG. 14D. Its interconnection with the control unit 26 is also shown in FIG. 16A. The STROBE pulse is essentially a clock pulse which updates or actuates the electrically programmable read-only memory EP4 for acceptance of serial data on the DATA line shown in FIG. 16A at input terminal PB7 of the latter-mentioned device EP4. There is provided, as is best shown in FIG. 14B a power circuit designated PSRT. The power circuit PSRT is fed by way of transformer X1 with 120 volts AC. The secondary of transformer X1 is center tap grounded to provide both positive and negative power supply voltages. A series of four diodes DiO is interconnected as shown in FIG. 14B to provide a set of output terminals which are positive and a set of output terminals which are negative. Connected to the uppermost in the latter-mentioned diodes is a voltage regulator unit VR1 which utilizes a Zener diode ZRD1 and two capacitive elements CD1 and CD2 to provide a +5 volt output level with respect to ground. An unregulated positive output voltage +V is connected between the aforementioned diode and the voltage regulator VR1. In a like manner, connected to the bottommost diode is a complementary negative unregulated voltage terminal −V. Correspondingly, a regulated −5 volt power supply terminal is interconnected with the negative unregulated terminal −V by way of a transistor QD1 and resistive elements RD1, RD2 and capacitive elements CD3 and CD4. Finally, a resistive element RD3 is interconnected with the anode of a Zener diode ZRD3, the cathode of which is connected to ground. The arrangement of the resistive element RD3 and the Zener diode element ZRD3 with respect to the negative unregulated power supply terminal −V is such as to produce a voltage −VPROT which is utilized in other portions of the RTD unit 29. The regulated power supply voltage, +5 volts, and the unregulated voltage −V, two noise suppression networks NSR1 and NSR2 utilizing resistors and capacitors interconnected with the negative and positive input terminals of an amplifier AR1 are utilized to create a clock circuit. The output of the amplifier AR1 is connected to one end of a resistive element RD1 and to one end of a capacitive element CD5. The capacitive element is fed back to the positive input terminal of the amplifier AR1 by way of a resistor. The other side of the resistive element RD4 is connected to the regulated +5 power supply. The output of the amplifier AR1 is known as the CLOCK signal and operates at 120 Hz in the preferred embodiment of the invention. Referring specifically, once again to FIG. 14A, an input circuit for the resistor temperature detective devices RTDD is shown. The latter-mentioned circuit comprises one input terminal which is connected to the junction between a resistive element RD8 and other resistive element RD9 and a capacitive element CD8. The other side of the resistive element RD8 is connected to the negative voltage −VPROT by way of a diode, is connected to ground by way of diode and is connected to the collector of a transistor QD3, the anode of which is connected to a capacitive element CD7 and a resistive element RD7. The other side of the resistive element RD7 is connected to the negative voltage −V. The other side of the capacitive element is connected to the base of the aforementioned transistor QD3 and to the collector of a transistor QD2 and to the minus voltage supply (−V) through a diode and a resistive element RD6. Resistive elements RD5 and CD6 are connected together and at the common junction thereof to the emitter of the aforementioned transistor QD2. The other side of the capacitive element CD6 is connected to the base of the transistor QD2 and to ground. The other side of the resistive element RD9 is connected to the negative input terminal of an amplifier AR2, to one side of the resistive element RD11 and to one side of a resistor element RD12, the other side of which is connected back to the output of the amplifier AR2. Resistive element RD11 is connected to the wiper of a potentiometer RD13, one side of which is grounded and the other side of which is connected to a voltage reference signal VREF. A resistive element RD10 is connected to the positive input of the amplifier AR2. Capacitive element CD10 is connected to the latter-mentioned positive input and capacitive element CD9 is connected to the other side of the resistive element RD10 and to a second input terminal from the resistance detector devices RTDD. A third input terminal from the resistance devices RTDD is connected to ground or system common. The output of the amplifier AR2 is designated VRTD0. The outputs of similar input circuits INC2 through INC10 are designated VRTD1 through VRTD9, respectively. These are supplied as parallel inputs to multiplexers MXRTD1 and MXRTD2. The latter-mentioned multiplexers may be of the type known in the art as "CD4051". Signals VRTD0 through VRTD7 are connected to input terminals 13, 14, 15, 12, 1, 5, 2 and 4, respectively, of the multiplexer MXRTD1. The signals VRTD8 and VRTD9 are connected to the input terminals 13 and 14 of multiplexer MXRTD2. The outputs of the latter-mentioned multiplexers are designated INH, A, B, C, and the signals thereat are called AB3, AB0, AB1 and AB2, respectively. Furthermore, there is a serial data output terminals CONO/I upon which the serial data signal S DATA 0 can be found. The multiplexers MXRTD1 and MXRTD2 take the parallel input data from the signals VRTD0 through VRTD9 and convert them to serial output signals for utilization at the input terminal INHI of an A to D converter AD4 which may be of the type known in the art as the "ICL7109".

There is also provided as shown in FIG. 14B a voltage reference circuit VRRT which is connected as input to the latter-mentioned transistor QD2. The circuit employing the latter-mentioned transistor QD2 is a constant current-producing circuit in which the current IK is provided. A portion of this constant current is utilized by the transistor QD4 to establish a reference to be utilized in conjunction with an amplifier AR3 and resistive devices RD13 through RD17. One of the voltage output signals is designated VREF and another voltage output signal is designated ADREF. The latter signal is supplied to the previously-mentioned A to D converter AD4 for empowering the same.

Table I shows the relationship between the resistive elements RD9, RD11, RD12 and RD13 and certainly commercially-available RTD types.

| RESISTOR | RTD TYPE | | |
|---|---|---|---|
| | COPPER | PLATINUM | NICKEL |
| RD9 | 6.19K | 27.4K | 43.2K |
| RD11 | 6.19K | 33.2K | 75K |
| RD13 | 200K | 2K | 1K |
| RD12 | 301K | 133K | 100K |

By utilizing the appropriate values for the resistors in question, either the copper, platinum or nickel RTD types can be utilized.

Figure 14C:
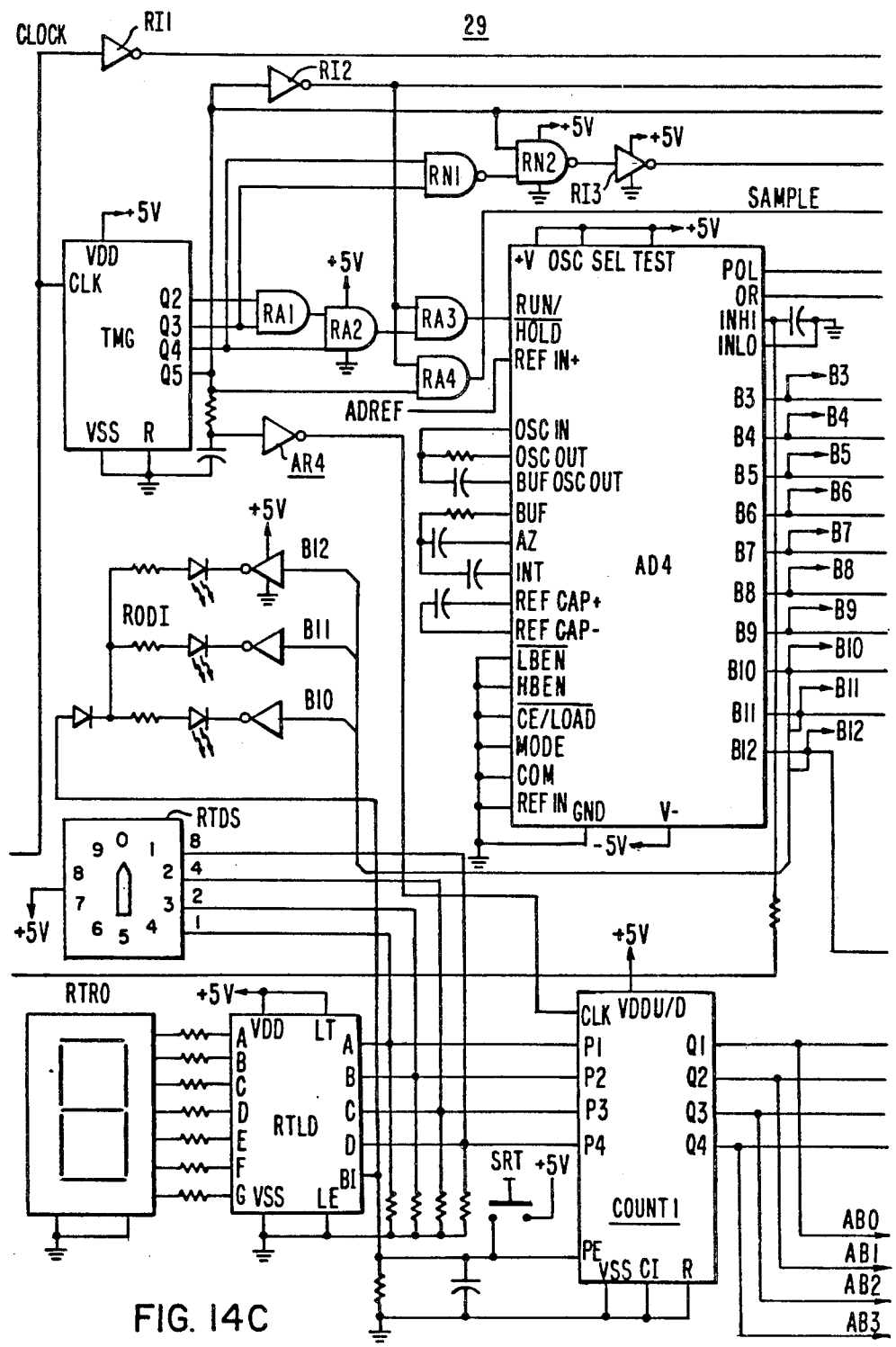
Figure 14D:
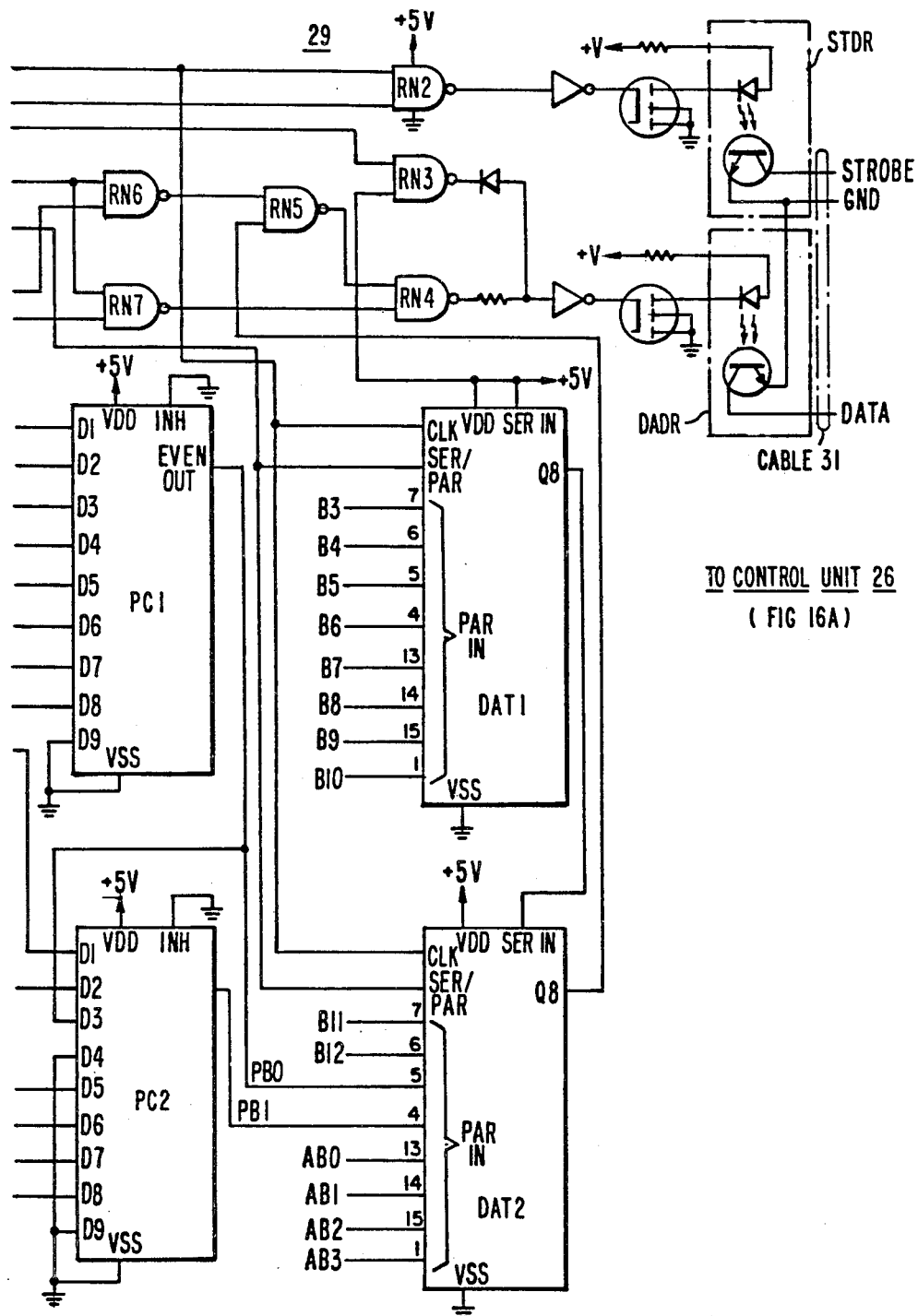

Referring specifically to FIGS. 14 and 14D, there is shown the previously-described A to D converter AD4. Its serial data input is designated INH1 as described previously. Its outputs are designated B3 through B12, respectively. Terminals B3 through B10 are connected with a data input device DAT1 of the kind known in the art as the "CD4014". Below that is a second similar device designated DATA 2 in which the lines B11 and B12 are interconnected and which are also connected to output signals PB0 and PB1 from parity checker devices PC1 and PC2 which will be described later hereinafter. Input PB1 is to the fourth input terminal (4) of the latter-mentioned device and input PB0 is to the fifth input terminal (5) of the latter-mentioned device. Connected to input terminals 13, 14, 15 and 1 of the latter-mentioned devices are signals AB0, AB1, AB2 and AB3, which will be described more fully hereinafter. There is provided a timing device TMG which has outputs Q2, Q3, Q4 and Q5, respectively, which is essentially a counter of the type known as "CD4024". The CLK input of this latter device is connected to the CLOCK output of the previously-described amplifier AR1. The frequencies produced at the outputs Q2, Q3, Q4 and Q5 are utilized to provide clock inputs for remaining portions of the circuit. There is provided a second counter designated "MC14510" and identified as COUNT 1 which has its CLK input connected to the aforementioned Q5 terminal of the timer TMG by way of an inverter AR4. There is also provided an RTDS select device which can pick any of the ten of the resistance terminal devices for display or sample. This device is a BED encoded switch having output terminals 8 4 2 1 which are interconnected with the P1 through P4 inputs of the counter COUNT 1 and with the A through D inputs of an RTD lamp driver RTLD. The lamp driver may be of the kind known as "MC14511". It provides outputs at terminals A through G thereof to a read-out device RTRO so that the resistance terminal device chosen on the selector RTDS will be displayed on the read-out device RTRO and will provide inputs to the counter COUNT 1. A switch SRT, when in the closed position, enables the selection of a specific RTD device. If the switch SRT is in the open position, binary outputs Q1 through Q4 of the counter iterate automatically from one to ten for setting up appropriate addresses. The latter-mentioned address lines AB0 through AB3 are interconnected as input line to the second parity checker PC2 at the inputs D5 through D8 thereof and at the second data output device DAT2 at the aforementioned input terminals 13, 14, 15 and 1, respectively, thereof. Further, the two multiplexers MXRTD1 and MXRTD2 receive the latter-mentioned data as mentioned previously at their input terminals A, B, C and INH, therefore. The most significant output digits from the A to D converter AD4 are found on terminals B10, 11 and 12. These are supplied to a read-out device RODI which illuminate as a function of the digital values on these latter three terminals.

In operation, the aforementioned current source provided by transistor QD2 that is current IK, is approximately 5 milliamps. It flows through the resistive element RM0 by way of transistor QR3 and resistive device RD8 to the return or ground circuit. The device of FIGS. 14A through 14D constitute what is best described as a parallel to serial transmission circuit. Once every 260 ms, a new sequential RTD output is selected by the counter COUNT 1. That output is digitized by the A to D converter AD4 and the digitized data plus "even" parity information and the RTD address code is stored in parallel to serial shift registers DAT 1 and DAT 2 as described previously. During the A to D conversion of the next RTD output, the previous sixteen bits of RTD output information is serially transmitted at a rate of 120 bits per second. The date is sent in the following sequence: AB3, AB2, AB1, AB0, PB1, PB0, B12, B11, B10, B9, B8, B7, B6, B5, B4 and B3. All data is sent most significant bit first. The previously described encoded switch RTDS, the readout RTDO and the switch SRT are utilized to override the automatic sampling of the RTD outputs mainly for test purposes. Known resistors can be applied to a selected RTD input which will cause bit transitions of the A to D converters three most significant bits. The status of these bits can be indicated by the three LEDs of the read-out device RODI, thus circuit operation and calibration can be verified.

It will be noted that in the upper portion of FIGS. 14C and 14D, there are a collection of AND gates, NAND gates, inverters and drivers. All of the above are interconnected with the timing device TMG or the CLOCK pulse or the A to D converter AD4 or the data output Q8 on device DAT2. As was mentioned previously, outputs Q2 through Q5 are frequency divided pulsed outputs which are related to the CLOCK input signal. If the CLOCK pulse is at a rate of 120 Hz, Q2 will be at 30 Hz, Q3 will be at 15 Hz. Q4 will be at 7.5 Hz and Q5 will be at 3.75 Hz. The CLOCK pulse is provided as an output to the strobe driver STDR for transmission to the control unit 26. The NAND gate RN2 will pass the CLOCK pulse unless it is disabled. In a like manner, the NAND gates RN5 and RN4 pass the data from the terminal Q8 of the data flip flop DAT2 unless either or both of the latter-mentioned NAND gates RN5 or RN4 are also disabled. Furthermore, the output of the NAND gate RN4 may be disabled if the output of the NAND gate RN3 is zero. The output of the NAND gate RN3 will be 0 if both of its inputs are one. It can be seen that one of its inputs is tied back to +5 volt power supply and therefore is forced to be one, so when the other input of device RN3 is one, the output thereof is zero, thus disabling the data transmitting NAND gate RN4. It can be seen that the Q5 output terminal of the timer TMG is provided as an input to both of the latter-mentioned NAND gates RN2 and RN3 for enabling and disabling purposes. The presence of the inverter RT2 means that the disabling which occurs with respect to the NAND gate RN2 is 180° phase shifted from the disabling which is associated with the NAND gate RN3. This is because a particular mode of cooperation between the various NAND gates RN2, RN3 and the other devices which they control. The net effect is that at a square wave rate of 3.75 Hz, both the CLOCK pulse (STROBE) and the data outputs (DATA) are prevented from being transmitted by way of cable 31 to the control unit 26. It can be seen that this very same Q5 signal is provided by way of the sample line to the serial/parallel inputs SER/PAR of the data transmission devices DAT1 and DAT2. When the SAMPLE signal is a digital one, then data is shifted out of the data device DAT1 into the data device DAT2 and follows the DAT2s data out of the terminal Q8 into the data line DATA of cable 31 by way of NAND gates RN5, RN4 and under the control of a NAND gate RN3. When a serial output is desired, the SAMPLE signal will be one and the device RN3 will be such that the output of device RN4 will not be disabled. Of course at this time, NAND gate RN2 is also in a non-disabled disposition so that the strobe information leaves concurrently from the STROBE output of the strobe's driver STDR. When the output Q5 is zero, the output of the AND gate RA4 or the SAMPLE signal is zero thus causing the devices DAT1 and DAT2 to be in the parallel input mode so that data is shifted in to these devices from the A to D converter AD4. It can be seen that the devices of FIGS. 14C and 14D alternate between a serial data output mode and a parallel data input mode as a function of the frequency 3.75 Hz signal found on the Q5 output terminal of the timing device TMG. It is to be understood that all of the other controls are synchronized with this frequency or some multiple thereof. Note that data transmission NAND gate RN5 can be disabled from the output of NAND gate RN6. Furthermore, data transmission NAND gate RN4 can be disabled from the output of NAND gate RN7. NAND gate RN6 is interconnected with the POL output of the A to D converter AD4. Likewise, an input terminal of an NAND gate RN7 is connected with the OR output of the A to D converter AD4. The POL output of the A to D converter AD4 indicates that the sum total of the digital data being shifted out is negative or positive (thus POL). The OR output indicates that the sum total of the digital data being transferred out of the A to D converter at any instant of time is either within range or over-range (thus OR). If the data is found to be negative or over-range or both by the A to D converter, the data is presumed to be invalid and the data transmission will be prevented by the interaction of the NAND gates RN5 through RN7. These conditions may occur, for example, if the RTDD device has failed. It will be noted that the three kinds of information which are shifted out of the data devices DAT1 and DAT2 have to do with the value of the temperature in the motor windings or bearings as a function of the RTD device, parity and an address. The address information AB0 through AB3 tells which particular RTD device is being sampled and the data information B3 through B10 is a digital representation of the actual value of the temperature. The parity information is such that the inputs to the device DAT1 can be even or odd parity. While the parallel inputs to the device DAT2 must be odd parity. The parity information is sent along cable 31 along with the address and data information so that when the microprocessor MP of FIG. 16C makes its own calculation on parity, it can compare it with the parity information provided to see if they are the same. If they are not the same, then the microprocessor may decide that the data is defective because of an error in transmission due to noise or otherwise.

Figure 7:
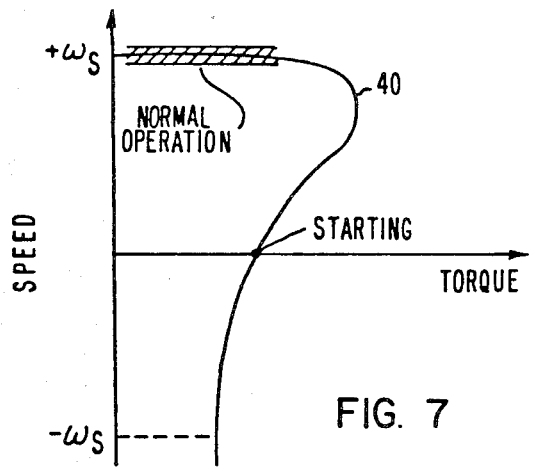
FIG. 7 shows a graph on which the speed-torque curve for a motor is depicted.
Figure 8:
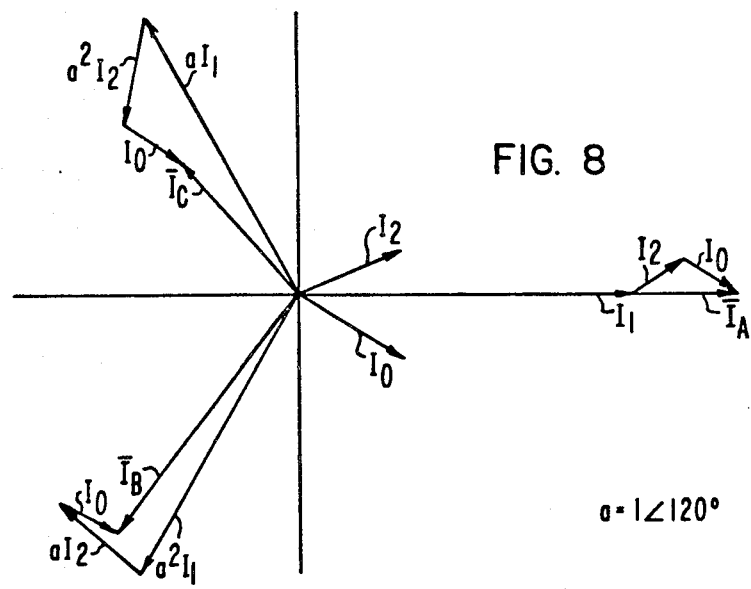
FIG. 8 shows a vector diagram of the unsymmetrical motor currents for an electrical motor.

Referring now to FIGS. 7 through 13, the utilization of positive and negative sequence currents with respect to the apparatus of the present invention is explained. It is to be realized that a three-phase electrical motor produces a rotating magnetic field across its air gap by the combination of time and space displacement of the motor currents and stator field windings, respectively. If the motor currents are equal in amplitude and 120° displaced and if the distribution of the three-phase windings in the stator slots is proper, the resulting rotating magnetic field has a sinusoidal wave shape and affixed rotational speed and direction. The rotational field is coupled to the rotor windings or bars in the case of a squirrel cage motor which results in induced rotor currents which produce a field which bucks the field generated by the stator. The force produced by the reaction of the air gap flux and the rotor currents is in a direction which tends to make the rotor spin in the same direction as the rotating field, but at a speed which is typically 3 to 5% slower. The resulting speed torque curve for a motor as shown in FIG. 7, the negative speed range corresponds to a dynamic braking situation which exists if the field is spending in a direction opposite from that of the rotating field. If the three line voltages of the motor are not balanced, the resulting motor currents also will not be balanced. A convenient and mathematical technique for analyzing such a situation is based on the use of symmetrical components. The unsymmetrical motor currents shown in FIG. 8 is based on the use of symmetrical components. The unsymmetrical motor currents shown in FIG. 8 as vectors $\bar{I}_A, \bar{I}_B, \bar{I}_C$ are represented by three sets of symmetrical vectors called positive, negative and zero sequence components. Equations 1, 2 and 3 below show a vector addition.

$$\overline{I}_A = I_0 + I_1 + I_2 \quad (1)$$

$$\overline{I}_B = I_0 + a^2 I_1 + a I_2 \quad (2)$$

$$\overline{I}_C = I_0 + a I_1 + a^2 I_2 \quad (3)$$

Figure 9:
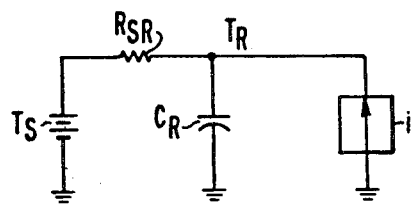
FIG. 9 shows a simplified thermal equivalent circle for the rotor of a motor.

The positive and zero sequence of components vectors are assumed to rotate in the same direction as the original vectors while the negative sequence components rotate in the opposite direction. The effect of even a small negative sequence component on rotor temperature can be significant as this produces a dynamic braking torque on the rotor corresponding to a large induced 120 Hz rotor current, while positive sequence components is required to supply both the motor output torque or load torque and at torque to balance the braking torque. The motor controller assembly 10 of FIG. 1, for example, should ideally provide rotor overtemperature protection by prediction. This prediction should be based on measurable quantities, such as stator currents and stator winding temperatures. The measurement of stator current amplitudes is not sufficient for motor protection calculations. Both amplitude phase and wave shape must be utilized. Further, the motor current information must be used with stator temperature information in combination if the rotor temperature is to be limited. The present motor controller protects the rotor of the machine that protects based on the combined effects produced by the symmetrical component values of the stator currents and the value of the winding temperatures. Both sinusoidal and non-sinusoidal motor currents can be accommodated. A simplified thermal equivalent circuit is shown in FIG. 9 for the motor under protection. Where temperatures are represented by voltages, thermal mass by capacitance, thermal resistance by electrical resistance, and heat flow by current flow. The value i is proportional to the amount of rotor heating produced by the current flow in the rotor. Equation 4 below governs rotor temperature:

$$i = I^2 = I_1^2 + K I_2^2 \quad (4)$$

In this case, i equals the total rotor heating value of the stator currents. $I_1$ is equal to the RMS value of the positive sequence value of stator current. $I_2$ is equal to RMS value of the negative sequence value of stator current and K equals the motor constant which is approximately 6, which is generally equal to the locked rotor current over the full load current. The rotor can be heated by heat flow through resistive device $R_{SR}$ from the stator or by heating produced by the rotor current represented by i. The model equation which governs the rotor temperature is given by:

$$C_R \frac{dT_R}{dt} = i + \frac{T_S - T_R}{R_{SR}} \quad (5)$$

The latter equation can be expressed as shown in equations 6 and 7.

$$\frac{dI_R}{dt} = \frac{i}{C_R} + \frac{T_S - T_R}{C_R R_{SR}} \text{ or,} \quad (6)$$

$$\frac{dI_R}{dt} = \frac{I_1^2 + K I_2^2}{C_R} + \frac{T_S - T_R}{C_R R_{SR}} \quad (7)$$

which involves the constants $C_R$ and $C_R R_{SR}$. The second term in both equations 6 and 7 represents a time constant value which relates to rotor cooling by means of heat conduction to the stator. This can be determined experimentally and is normally assumed to range from 15 to 30 seconds for a large motor. The value of $C_R$ is related to locked rotor current ($I_{LR}$), stall time ($T_S$), and maximum rotor bar temperature ($T_{RMAX}$) which is about 440° C. for an aluminum squirrel cage motor. If the initial rotor temperature is assumed to be 40° C. and the heat loss from the rotor to the stator is neglected, the following approximations are true as shown in equations 8, 9 and 10.

$$\frac{\Delta T_R}{\Delta t} \approx \frac{I_{LR}^2}{C_R} \quad (8)$$

$$\frac{T_{RMAX} - 40° C.}{T_S} \approx \frac{I_{LR}^2}{C_R} \quad (9)$$

$$C_R \approx \frac{I_{LR}^2 T_S}{T_{RMAX} - 40° C.} \quad (10)$$

Figure 10:
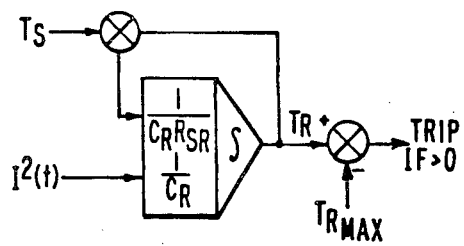
FIG. 10 shows an analog representation of the circuits of FIG. 9.
Figure 11:
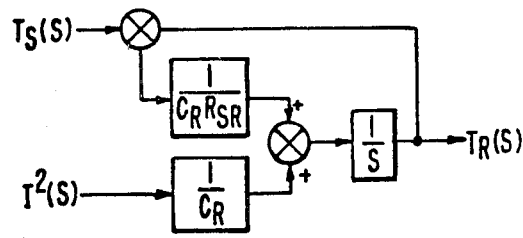
FIG. 11 shows an equivalent transfer function representation for the analog representation of FIG. 10.

The preceding, including the value of $R_{SR}$ applies to locked rotor conditions. The model given by FIG. 9 is thus used to protect the rotor of a large machine during starting. Once the machine is spinning, cooling air flows through the air gap thus greatly modifying the thermal equivalent circuit. At this time, the need for motor protection shifts from the rotor to the stator. Simple overtemperature protection can be provided by stator isolation temperature measurements given by the RTD measurements associated with the RTD unit of 29 and the description associated with FIGS. 14A through D. An analog computer representation of FIG. 9 is given in FIG. 10. The equivalent transfer function representative of the analog arrangement of FIG. 10 is shown in FIG. 11. The protection scheme can be implemented by means of a sample data control theory based on Z transforms or by means of a central differential equation derived from equation 7. The foregoing is depicted in equations 11, 12 and 13.

$$I_1 = \tfrac{1}{3}[\overline{I}_a + a\overline{I}_b + a^2\overline{I}_c] \quad (11)$$

$$I_2 = \tfrac{1}{3}[\overline{I}_a + a^2\overline{I}_b + a\overline{I}_c] \quad (12)$$

$$I_0 = \tfrac{1}{3}[\overline{I}_a + \overline{I}_b + \overline{I}_c] \quad (13)$$

Figure 12:
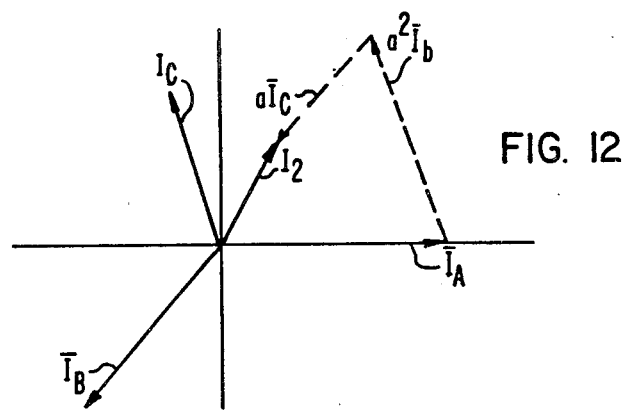
FIG. 12 shows a representation of a vector calculation of symmetrical current components for a motor.
Figure 13:
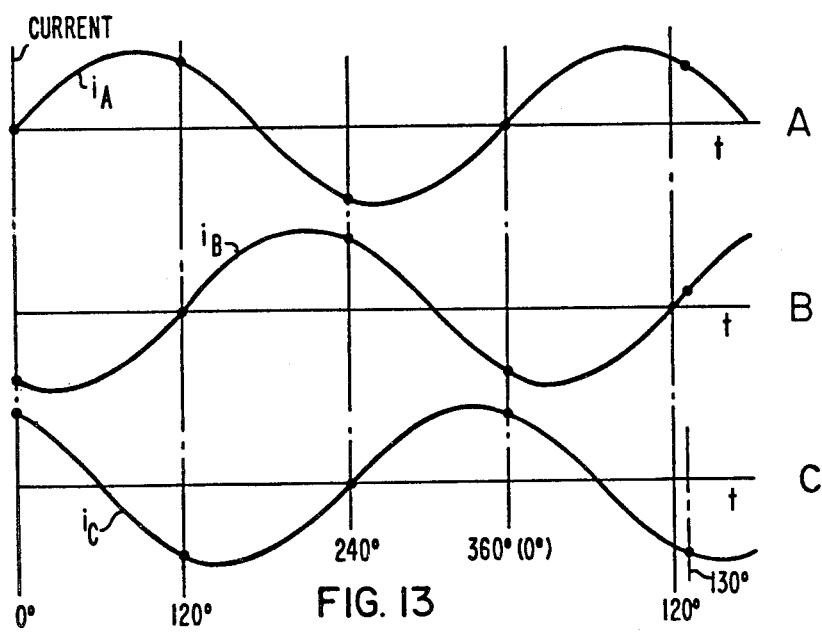
FIG. 13 shows instantaneous three-phase currents for a motor with appropriate sampling intervals for utilization in a microprocessor.

The effect of this is shown in FIG. 12 which essentially represents a vector calculation of symmetrical components. The analog circuit solutions to equations 11, 12 and 13 require 120° phase shifting networks which assumes sinusoidal currents. The digital representation, however, is valid for non-sinusoidal currents. In addition to sinusoidal currents and utilizes electrical current sampling techniques with the phase shifting achieved by summing samples taken at 0, 120 and 240° intervals. This is best respresented by observing FIG. 13, Table III and equations 14, 15 and 16.

TABLE III

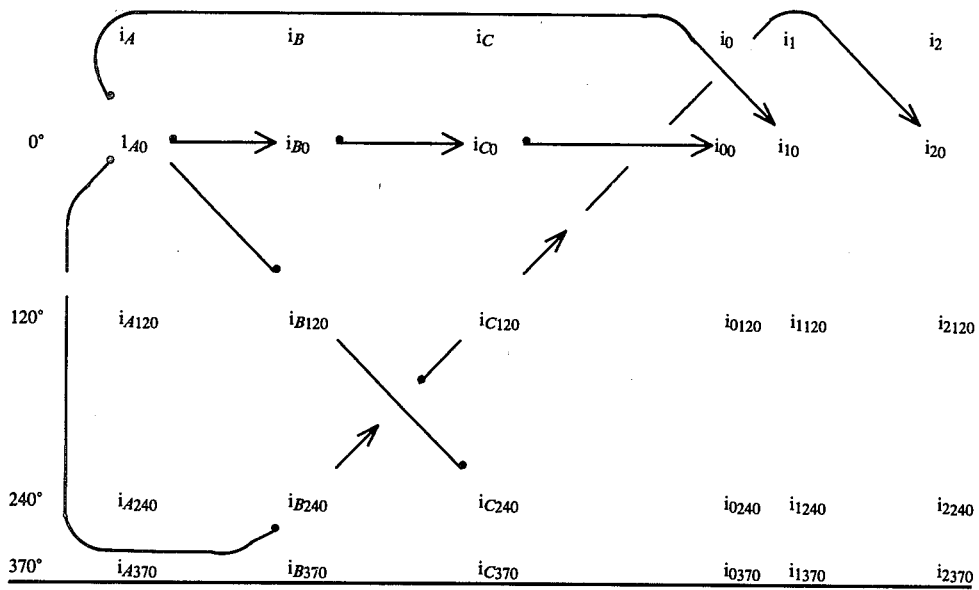

$$i_{10} = \tfrac{1}{3}[i_{A0} + i_{B120} + i_{C240}] \quad (14)$$
$$i_{20} = \tfrac{1}{3}[i_{A0} + i_{B240} + i_{C120}] \quad (15)$$
$$i_{00} = \tfrac{1}{3}[i_{A0} + i_{B0} + i_{C0}] \quad (16)$$

The quantities $i_{10}$, $i_{20}$ and $i_{0c}$ represent the instantaneous values of the positive, negative and zero sequence currents respectively at 0°. As is shown in Table I, the equations represents diagonal and horizontal summing of the values $i_A$, $i_B$ and $i_C$ present in the Table. If the current is assumed to be constant for the second cycle, then $i_{360°} = i_{0°}$ and equation 17 applies:

$$i_{1120} = \tfrac{1}{3}[i_{A120} + i_{B240} + i_{C0}] \quad (17)$$

The values of $i_1$, $i_2$ and $i_0$ can thus be calculated at 0°, 120° and 240° by knowing the values of Table 1.

The protective relationship requires knowledge of the RMS value squared of the positive and negative sequence currents, $I_1^2$ and $I_2^2$ rather than the instantaneous values. Thus, equations, 18 or 19 are representative.

$$I_1^2 = \tfrac{1}{T} \int_0^T i_1^2 \, dt \quad (18)$$

$$I_1^2 \simeq \tfrac{1}{K} \sum_{N=1}^{K} i_{1N}^2 \quad (19)$$

Thus, if the samples are taken each 120°, only three values of $I_A$, $I_B$ and $I_C$ will be using the calculation of equation 19 and the result could be very inaccurate. To avoid this, the sample as taken during the second cycle of the power line monitor by the current transformers 30, for example, are taken at slightly later times than during the first cycle. As an example, a delay of 10° each time can be utilized. In this case, a total of 36 samples of the currents are obtained for each cycle. A total of 36 cycles in the power line is in general required to obtain all the data. However, because of the similarity of the three currents, $I_A$, $I_B$ and $I_C$, a total of only 12 cycles is actually required. The value of $I_1^2$ can thus be calculated every 12 cycles (0.2 seconds at 60 Hz.) of the power line and is given by equations 20, 21, 22 and 23.

$$I_1^2 = \tfrac{1}{36} \sum_{K=0}^{11} \sum_{N=0}^{2} I_{1N \cdot 120 + K \cdot 10°}^2 \quad (20)$$

$$I_2^2 = \tfrac{1}{36} \sum_{K=0}^{11} \sum_{N=0}^{2} I_{2N \cdot 120 + K \cdot 10°}^2 \quad (21)$$

$$I_0^2 = \tfrac{1}{36} \sum_{K=0}^{11} \sum_{N=0}^{2} I_{0N \cdot 120 + K \cdot 10°}^2 \quad (22)$$

where $I_{1N \cdot 120 + K \cdot 10}^2 = \quad (23)$ $$\tfrac{1}{3^2} \{i_{AN \cdot 120 + K \cdot 10} + i_{BN \cdot 120 + K \cdot 10} + i_{CN \cdot 120 + K \cdot 10}\}^2$$

It is of interest that the value $\bar{I}_2^2$ is zero even for non-sinusoidal currents, if the three-phase current has the same wave shape and are displaced in time by 120°. Further the value of $\bar{I}_1^2$ is the value of the RMS phase current squared and thus the protection is based on the true RMS motor current calculations. This is very important as the protection arrangement does not rely on sinusoidal motor currents. Experience has shown that if it is not possible to sample the currents $I_A$, $I_B$, and $I_C$ simultaneously, it is important that the sequence in which the currents are sampled should be staggered by ABC, BCA, CAB to minimize false calculations of a negative sequence current. The foregoing is therefore utilized in the control unit 26.

OPERATION OF THE CONTROL UNIT 26

The microprocessor unit MP initializes itself and examines switch inputs such as are shown to the left of the unit 26 of FIG. 2. It looks at the programmable read-only-memories EP1 through EP5 and reads any tables which are stored therein, it being noted that the latter programmable memories provide memory capability for the microprocessor MP. It also initializes the random access memories VR1 and VR2. It also defines whether a port such as typically shown to the right or random access memories VR1, VR2 or the electrically programmable read-only-memories EP1 through EP5, for example, are to be in the input mode or output mode, it being understood that data can flow both ways. Furthermore, there is an interrupt signal on the RST input of the microprocessor that is to be read every 5.56 milliseconds. To allow that to be read by the processor an internal mask has to be reset. This is done during initialization. The volatile RAM VR1 provides at the output T/OUT/ a signal which allows the microprocessor to operate on the above-indicated 5.56 ms cycle. This timer is what causes the overall routine of the microprocessor to be interrupted three times a line voltage cycle so that the aforementioned implementation described with respect to FIGS. 7–13 can take place. The tables defined previously which are stored in the electrically programmable read-only-memory EP1 through EP5 Contained data associated with Table II herein. This data was placed there by utilizing the key switch SW7 in the PROGRAM mode and the various operations described previously with respect to FIG. 6C, for example. As soon as the key switch SW7 is turned to PROGRAM, the microprocessor is set up to interpret the pushbuttons SW6 and SW3 in such as way that a FUNCTION can be selected and a TRIP, ALARM, or TIME value, for example, can be incremented or decremented. This information is fed to the microprocessor MP by way of the port designated PB0 through PB7 on the device EP5. This information is processed by the microprocessor and then sent to the non-volatile read-only-memory NVR and the volatile random access memories VR1 and VR2, for example, by way of cables A. Note that the volatile random access memories VR1 and VR2 perform two functions, one of which is input and output and the other of which is memory. So one of the things to consider is that setpoints which had previously been stored in the non-volatile memory NVR can be read by the microprocessor MP. At this point in the operation the motor contactors M1, M2 and M3 have not been closed, so the microprocessor MP, although performing some initialization, is essentially waiting for an input to indicate that a start of the motor sequencing function, as is typically known in the motor art, should occur. Meanwhile, all of the inputs and outputs of the control device 26 are constantly being monitored mainly to determine if their status has changed or should be changed. This is done in sequence, not in parallel, although it occurs so quickly it looks as if its being done in parallel. The main sequencing occurs by utilizing the chip enable CE on each of the devices described previously. Of course as was mentioned previously, effective programming can be accomplished at this time. One of the values that can be programmed is STARTER CLASS. One of the tables permanently stored in one of the electrically programmable read-only-memories EP1 through EP5 is related to various classes of motors (see Table II). By going into a programming mode and utilizing the switches SW6 and SW3 this table can be incremented or decremented to the next class or kind of motor. This allows the motor controller to be changed literally from a motor controller for one type of motor operation to a motor controller of another type operation. Furthermore, the previously described motor class table has associated therewith other tables (not shown) which are automatically referred to once the appropriate motor class is selected. This provides the controller assembly 10 with a great deal of flexibility. This is done by utilizing the key switch SW7 in the PROGRAM mode and stepping through the appropriate functions until the words "starter class" appear in the FUNCTION readout of the panel 24. It will be noted that the ALARM and TIME readouts will have contained therein at this time a numerical representation of the starter class that the controller assembly 10 is designed to accommodate. That can be changed by utilizing the switches SW6 and SW3 to increment or decrement to other stored starter classes. These classes in turn are referred to in other parts of the memory for any new kinds of functions which are associated with that starter class. As an example, motor style or class 11202 is an across-the-line starter which only has one contact associated with it. A motor class such as 14202 may have three or four contacts associated with it, so with each of these code numbers a different sequencing may be utilized by the microprocessor MP for effective starting and control of the motor. Once it has been established that there is a ligitimate start request, the microprocessor looks at the starter class number which has been programmed in and is available, and based upon that number the microprocessor will then go to a specific motor start sequence. At this point of time, if any of the specific requirements for a startup is not met, the start will be aborted, and the words "IMPROPER START" will come up on the FUNCTION display, or the word "EMERGENCY STOP" will be displayed in the FUNCTION display. One of the things that is also done at this time is the phase of the voltages are sensed to assure that the particular motor class selected is utilized in the proper phase relationship. A test is done on the input voltage at this time to assure that phase A does in fact precede phase B which does in fact precede phase C, and starting is inhibited until the proper sequences of phases is achieved. This phase information is inferred from the signals VCB and VAB shown in FIG. 2. Once a valid start command is present, prestart conditions are actuated, and the prestart relay is closed if some peripheral equipment needs to be actuated. The reason for this is that for some classes of motors it may be necessary to start peripheral equipment like a conveyor belt or a pump as an example. The PRE-START output will activate this peripheral equipment. The microprocessors will make sure that the prestart condition has been met by the closing of the prestart relay PRE-ST to the left in FIG. 2. This indicates that the remote equipment is operating and at this point power can be applied to the motor. If the prestart condition is not met within a certain period of time, an IMPROPER START message is provided at the FUNCTION output of FIG. 5. After the prestart sequence is successfully completed, power is applied to the motor according to the motor style that has been programmed. Relays are closed in a certain sequence, depending upon the demands of the motor style. At this time a software timer begins to run. If appropriate motor conditions are not met in this period of time, then the microprocessor stops the operation. A typical example occurs in a reactor start motor. The reactor is left in the line for a certain amount of time to reduce the voltage as the motor is started so that the motor does not draw excessive current. As it moves up to speed, the reactor is pulled out of the line and the full line voltage is applied. At the expiration of the starting time, the start conditions are aborted as dictated by the particular program motor style and the controller enters the run mode for the motor. This may or may not entail changing relays which are applying power to the motor. Note, however, that during all of this the microprocessor still monitors motor protective functions. The status of all inputs are monitored, even the display inputs. During startup it is possible to take data from the pushbuttons, but the microprocessor will not respond to it, for example, if the step switch SW4 is actuated there will be no response. Note that an emergency stop can be instituted at any time and in fact bypasses the microprocessor. This can be done by the utilization of an external contact closure, such as E-STOP shown to the left in FIG. 2. However, the microprocessor is alerted to this by the ESO output shown in FIG. 16D. This ESO output is provided to the electrically programmable read-only-memory EP4, and then the microprocessor. So even though the microprocessor is bypassed in an emergency stop situation, it is still alerted to the fact that an emergency stop is taking place and can act accordingly. ESO means "emergency stop output". The microprocessor can then take action independently of the emergency stop relay E-STOP REL just by using its own internal program. As was mentioned, after the microprocessor has reached the end of the starting operation, it now goes into the load or run mode. This occurs after the expiration of the previously described timing increment. At this point the motor and microprocessor can act without any significant changes for months, if need be, without interaction with an operator. Furthermore, it will go through a three times per cycle current-voltage monitoring technique as described previously with respect to FIGS. 16E, 16F, 16G, for example. The current points associated with FIG. 13, for example, are calculated over a 12-cycle period. Three samples are taken per cycle over 12 cycles. This gives 36 samples. At the end of the twelfth cycle the microprocessor will begin to look at the data that has been accumulated over the 12 cycles and processings of that data take place for determining negative sequence current, etc. Some operations do not operate on a 12-cycle basis, however. One is instantaneous overcurrent. If instantaneous overcurrent is sensed by the microprocessor by way of its communication with the current transformers of FIG. 16E as routed through device EP5, the microprocessor will operate on a 1-cycle basis, and if necessary, a trip function will be executed. Furthermore, the RTD devices provide inputs to the control unit by way of cable 31 and these devices are monitored. Typically, this is done on a 6-second time frame. This information gets into the control unit by way of programmable read-only-memory EP4 and it is utilized in conjunction with stator current data, as described previously. At this point, the controller is in a position to react to a stop request. This stop request may be begun by actuating pushbutton 22, for example, as is shown in FIG. 2. The microprocessor operates to determine that the request is legitimate and then goes into a stop sequence, which is also determined by motor class number as described previously. This would be a normal controlled stop. Prestop relays are closed where necessary, for example to stop a conveyor belt or to issue an alarm that the motor is going to stop, and at an appropriate time the main contactors, for example, M1, M2 and M3 are opened. If certain reports are not fed back to the microprocessor concerning a stop condition, such as might be found at the prestop PRE-STP input of FIG. 2, then an improper stop message may be displayed in the FUNCTION portion of the front panel 24. Note than an emergency stop, that is a very fast stop which may even be close to a panic stop, can occur even during a normal stop routine. Everything is dropped out very quickly. The typical $I^2T$ current situation upon which many circuit protective devices operate is related to the inputs IA, IB and IC and to the RTD inputs as are determined on a 12-cycle and 6-second basis, respectively. Information from both the RTD units and the stator currents IA, IB and IC are placed into a software accumulator where the total net effect of all current are taken into account. It is possible that a condition could exist where the $I^2T$ by itself is not enough to initiate some sort of action. But if looked at in conjunction with other heat sources, as measured by the RTD's, inferences about the heat in the rotor are such as to require shutdown. Note that rotor current is not measured directly; it is inferred by the utilization of negative sequence components, etc., as determined in the stator windings. Note also that the microprocessor can act on a typical ground fault trip situation. Motor jam underload and open phase unbalance can also be handled by the microprocessor. These things are typically looked at in sequence, but typically only looked at once during the 12-cycle period. Typically, every operation that has to be performed is done within the 12-cycle period. Some of the things will be done many times within the 12-cycle period and other things will be done only once during the 12-cycle period. Presume that the 12-cycle period is over. The next thing that the microprocessor would do, and it does not have much time to do this before the next 12-cycle period starts, is to see if any of the displays must be refreshed. Pushbutton situations are monitored, etc. Note that the microprocessor operates in a controlled fashion, monitoring inputs and outputs, refreshing displays, resting if need be on a continuous basis, but is interrupted once every 5.56 seconds for completing a new sampling technique associated with the currents IA, IB and IC, etc. During the 5.5 millisecond time frame, about 4 to $4\frac{1}{2}$ milliseconds are utilized in calculating overcurrents, sampling inputs and the like. So only 1 to 2 milliseconds are available for going through other functions that are again periodically interrupted. Note that the DEAD MAN circuit described previously looks for the 5.56 cycle input signal. If it does not receive one of these during an appropriate time frame, the DEAD MAN presumes that the microprocessor is not acting intelligently and operates to begin to reinitialize the microprocessor by way of the TRAP input thereof. Note that the metering associated with the readouts on the front panel 24 is controlled by the microprocessor, and this usually occurs by sampling various inputs and outputs and displaying those as required by the operator.

It can be seen therefore that the microprocessor-controlled motor controller or controller assembly utilizes a routine which determines if it is necessary to completely shut down a motor after a temporary undervoltage condition. If the power failure is of a relatively short term, say less than 18 cycles, a subroutine will allow the motor to continue running essentially as if nothing happened. If the failure is for a relatively longer term but still not what could be described as an excessively long term, then certain valuable memory information will be preserved even though it will necessitate restarting the motor automatically. Of course, if the long term outage is detected, then a manual restarting of the motor will be required. All of this has the advantage of preventing a motor from being shut down which does not need to be shut down, it being understood that a temporary power outage does not always require a motor to be shut down or stopped.

We claim:

1. A motor controller, comprising:

contactor means interconnected with the power supply lines of an electric motor for opening said power supply lines upon the presence of a command signal thus stopping said motor;

first voltage sensing means interconnected with said power supply lines for providing a voltage-related output signal for said power supply lines;

second voltage sensing means interconnected with said power supply lines for providing a time-related output signal indicative of the time which has expired since a voltage value on said power supply lines has droppped below a predetermined level;

current sensing means interconnected with said power supply lines for providing a current-related output signal for said power supply lines;

control means interconnected with said contactor means for supplying said command signal, said control means, comprising:

microprocessor means for performing control and calculation functions for said control means;

first memory means interconnected with said power supply lines for being empowered thereby and interconnected with said microprocessor means for providing stored data thereto; and reset means interconnected with said microprocessor means and said first voltage sensing means for initializing said microprocessor when said voltage value drops below said predetermined value and for causing said command signal to be subsequently sent to said contactor means, upon initialization said microprocessor means testing said memory means for determining if the stored data therein is reliable, if said data is determined to be reliable said microprocessor means interacting with said current sensing means for determining if current is flowing in said power supply lines, if said current is determined not to be flowing, said microprocessor interacting with said second voltage sensing means to determine if the time which has expired is greater than a predetermined time value, if said time is not greater than said predetermined time value, said microprocessor operating to automatically restart said motor.

2. The combination as claimed in claim 1 wherein if said current is determined to be flowing, said microprocessor aborts said command signal and then returns to the state it was in prior to said voltage value dropping below said predetermined value.

3. The combination as claimed in claim 1 wherein if said time is greater than said predetermined time value, said microprocessor assumes a state which requires manual restart of said motor.

* * * * *